US006487543B1

(12) United States Patent
Ozaki et al.

(10) Patent No.: US 6,487,543 B1
(45) Date of Patent: *Nov. 26, 2002

(54) MEDIA-INTEGRATING SYSTEM, TERMINAL DEVICE, RECORDING MEDIUM AND BROADCASTING METHOD FOR USE IN THE MEDIA-INTEGRATING SYSTEM

(75) Inventors: Tomochika Ozaki, Yokohama (JP); Tadashi Kuwabara, Yokohama (JP); Michio Morioka, Kashiwa (JP); Yuichi Yagawa, Yokohama (JP); Shigeki Hirasawa, Sagamihara (JP); Akio Yajima, Tokyo (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,026

(22) Filed: Dec. 12, 1997

(30) Foreign Application Priority Data

Dec. 13, 1996 (JP) .............................. 8-333848

(51) Int. Cl.$^7$ .......................... H04N 5/50; G06F 13/00
(52) U.S. Cl. ..................... 705/112; 725/51; 725/136; 709/217
(58) Field of Search .................. 348/12, 13, 6; 345/327, 328; 455/5.1; 395/200.47; 725/51, 109–113, 131–136; 709/217, 218

(56) References Cited

U.S. PATENT DOCUMENTS

| | | | | |
|---|---|---|---|---|
| 5,724,102 A | * | 3/1998 | Harrison et al. | 348/552 |
| 5,724,103 A | * | 3/1998 | Batchelor | 348/553 |
| 5,726,702 A | * | 3/1998 | Hamaguchi et al. | 348/13 |
| 5,774,664 A | * | 6/1998 | Hidary et al. | 395/200.48 |
| 5,774,666 A | * | 6/1998 | Portuesi | 395/200.48 |
| 5,892,825 A | * | 4/1999 | Mages et al. | 380/3 |
| 5,905,865 A | * | 5/1999 | Palmer et al. | 395/200.47 |
| 5,929,849 A | * | 7/1999 | Kikinis | 345/327 |
| 5,937,164 A | * | 8/1999 | Mages et al. | 395/200.48 |
| 6,125,388 A | * | 9/2000 | Reisman | 709/218 |

* cited by examiner

Primary Examiner—Andrew Faile
Assistant Examiner—Reuben M. Brown
(74) Attorney, Agent, or Firm—Crowell & Moring LLP

(57) ABSTRACT

Information associated with broadcasting, information associated with a network, and information associated with a package are included in data. A terminal device has means for acquiring data from broadcasting, data from the network, and data from the package. The terminal device further has a means for displaying the data acquired by the above-mentioned means together or a means for displaying information included in the data as a link. This novel constitution allows positive information provision to users by a combination of three types of media, broadcasting, network, and package. At the same time, this novel constitution allows provision of new services by making the most of mass storage provided by package and up-to-date information provided over network.

2 Claims, 33 Drawing Sheets

< HTML >
< HEAD >
< TITLE > test < /TITLE >                              260

< IMInfo AccessKey = "1111" PpvFree = "9999" >

< B CInfo ch = 100 date = "1996/12/12" time = "10:10:10" >
                                                      220
< /HEAD >
< BODY >                       230
< A  HREF = "tv://ch100"  date = "1996/12/13"  starttime = "8:45"  length = "1:00"
AccessKey = "2222"  PpvFree = "9999" >

< /A >
                     240
< A  HREF = "file:///D I /index.htm  PackageID = "0001"  PackageName = "MAIL
SHOPPING DECEMBER ISSUE IN 1996"  decipherkey = "1234567"  AccessKey =
"3333"  PpvFree = "9999" >

< /A >

< A     HREF = "http://www.hitachi.co.jp/index.htm   LoginID = "HITACHI"
LoginPass = "TARO"    decipherkey = "1234567"    AccessKey = "4444"
PpvFree = "9999" >

< /A >                          250

< /BODY >
< /HTML >
```

```
< HTML >
< HEAD >
< TITLE > CIPHERED DATA < /TITLE >
< /HEAD >                              280
< BODY >
┌─────────────────────────────────────────────┐
│ < CIPHER method = "MULTI"  encode = BASE64 >│
│ [ CIPHERED DATA ]                           │
│ < /CIPHER >                                 │
└─────────────────────────────────────────────┘
┌─────────────────────────────────────────────┐
│ < NOCIPHER >                                │
│ THIS DATA IS CIPHERED                       │
│ < /NOCIPHER >                               │
├─────────────────────────────────────────────┤
│ < /BODY >                            285    │
│ < /HTML >                                   │
└─────────────────────────────────────────────┘
```

INSERT PACKAGE
"MAIL SHOPPING DECEMBER ISSUE"

FIG. 20
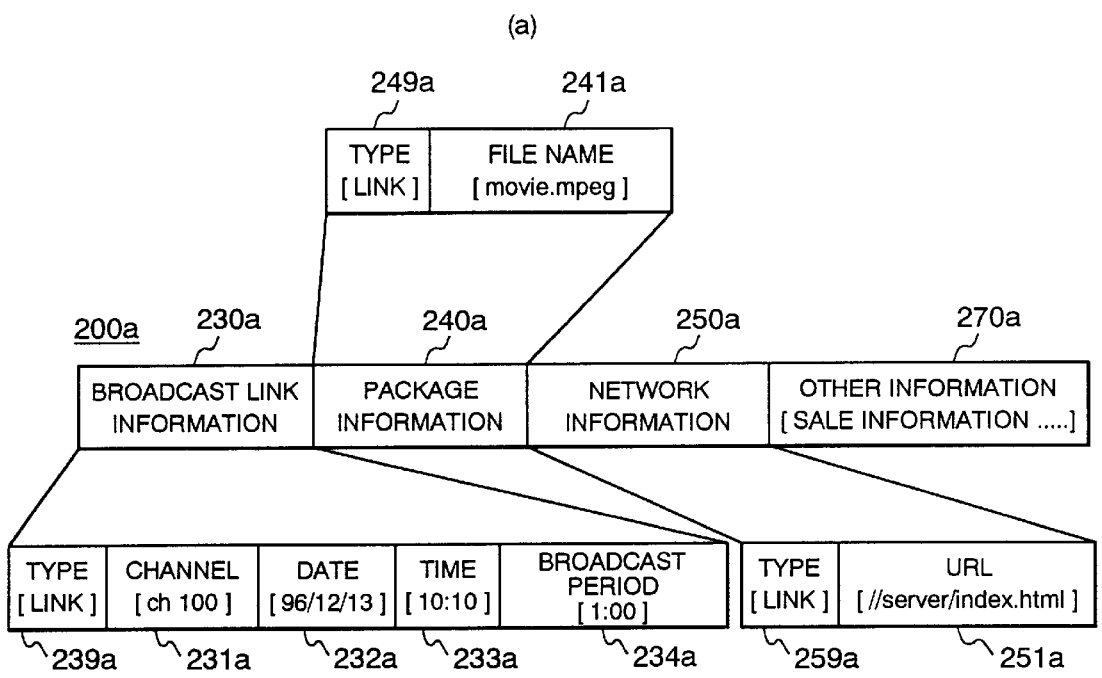
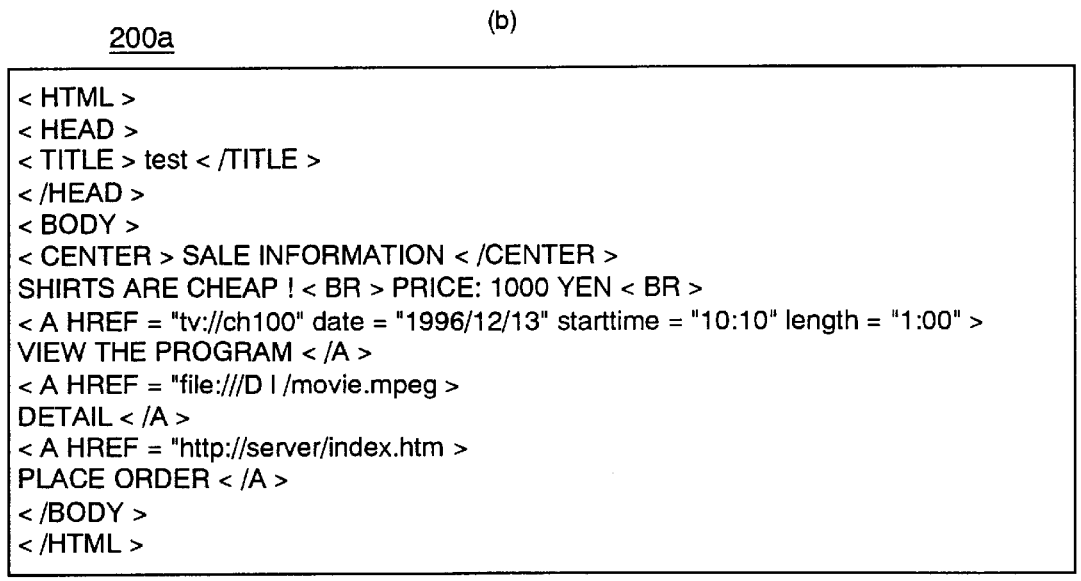

FIG. 22
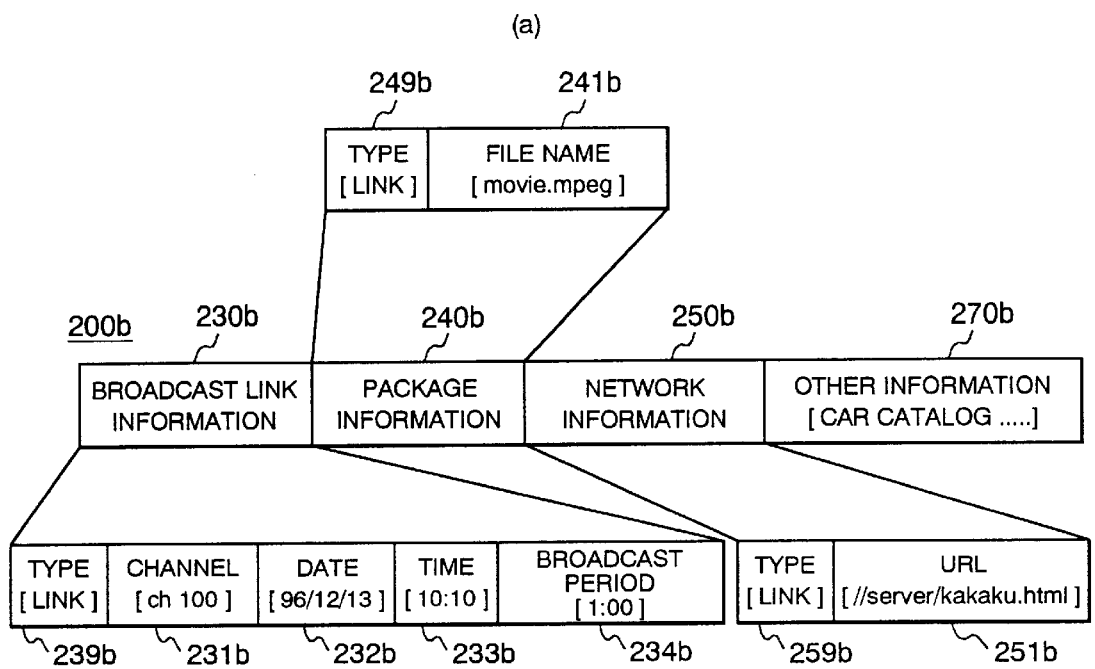
(a)
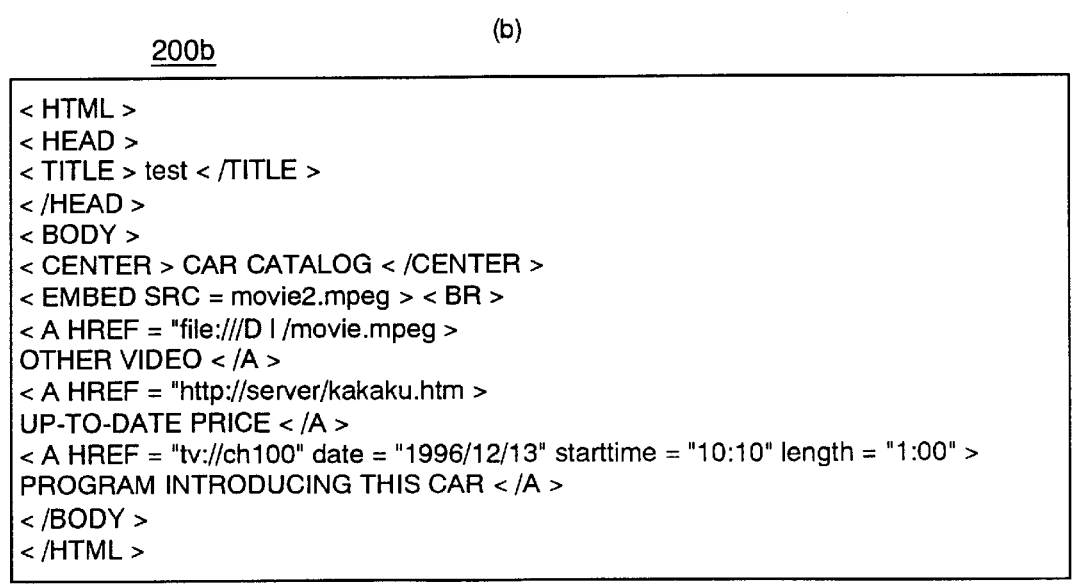
(b)
```
< HTML >
< HEAD >
< TITLE > test < /TITLE >
< /HEAD >
< BODY >
< CENTER > CAR CATALOG < /CENTER >
< EMBED SRC = movie2.mpeg > < BR >
< A HREF = "file:///D l /movie.mpeg >
OTHER VIDEO < /A >
< A HREF = "http://server/kakaku.htm >
UP-TO-DATE PRICE < /A >
< A HREF = "tv://ch100" date = "1996/12/13" starttime = "10:10" length = "1:00" >
PROGRAM INTRODUCING THIS CAR < /A >
< /BODY >
< /HTML >
```

(b)
200d

```
< HTML >
< HEAD >
< TITLE > test < /TITLE >
< /HEAD >
< BODY >
< CENTER > CAR SALE INFORMATION < /CENTER >
< EMBED SRC = "file:///D I /movie.mpeg" >
CARS OF XX COMPANY ARE CHEAP < BR >
NUMBER OF CARS ON SALE: < IMG SRC = "http://server/getcount.cgi" >
< /BODY >
< /HTML >
```

(a)

(b)

```
200f
< HTML >
< HEAD >
< TITLE > test < /TITLE >
< /HEAD >
< BODY >
< CENTER > SPECIAL INFORMATION < /CENTER >
FOR DETAILS, VIEW CD.
< A HREF = "file:///D I /index.htm" PackageID = "CD001" PackageName = "XX MAIL
ORDER, DECEMBER ISSUE" cipherkey = "abc" >
DETAIL < /A >
< /BODY >
< /HTML >
```

MEDIA-INTEGRATING SYSTEM, TERMINAL DEVICE, RECORDING MEDIUM AND BROADCASTING METHOD FOR USE IN THE MEDIA-INTEGRATING SYSTEM

BACKGROUND OF THE INVENTION

The present invention generally relates to a media-integrating system including a service in which information providing media such as broadcasting, telecommunication, and electronic publishing are integrated, an information providing method of realizing that service, and a terminal device for realizing that service.

Recently, in the electronic publishing industry, URL (Universal Resource Locator) that indicates locations of Internet information is recorded on a CD-ROM and the recorded URL is displayed as a link on a user terminal upon reproduction of the CD-ROM, thereby allowing the user to access desired information on the network simply by selecting the link.

In addition, a service is in practice in which data described in HTML (HyperText Markup Language) is transmitted by broadcasting to be displayed on terminal devices on which users select displayed links to access desired information on the network.

However, a combination of conventional electronic publishing (namely, a package), typically a CD-ROM, and telecommunication (namely, a network), typically the Internet, poses a problem that information cannot be obtained unless users go to search for desired information.

In a combination of broadcasting and network, information providers actively provide information to users rather than making them search for information, but there is a problem that broadcasting is incapable of sending large amounts of data. If large amounts of data are sent by consuming time, each receiving terminal requires a storage device large enough for storing the received data.

As is evident from the description so far, it is difficult for only these combinations of package and network and broadcasting and network to provide services satisfactory enough for users.

It is therefore an object of the present invention to provide a media-integrating system capable of actively providing information to users by a combination of three entities; broadcasting, network, and package.

It is another object of the present invention to provide a media-integrating system capable of providing new services making the most of mass storage inherent to package and up-to-dateness inherent to network.

It is still another object of the present invention to provide a medium for storing or distributing a data structure for implementing services according to the present invention and the data about this structure.

It is yet another object of the present invention to provide a terminal device capable of receiving the services provided according to the present invention.

SUMMARY OF THE INVENTION

The basic concept of the present invention is that information distributed by broadcasting, communication network, and package can be obtained by use of link information.

Therefore, a media-integrating system according to the present invention comprises a terminal device capable of receiving first information from a first medium, second information from a second medium, and third information from a third medium and a means for adding first link information to the above-mentioned first information to provide link with the above-mentioned second information and third information.

In the present invention, first, data to be used is constituted by the following information combination:
(1) filter information for selecting information;
(2) synchronization information for displaying information in synchronization with a television program;
(3) broadcast link information associated with a related television program;
(4) package information for acquiring data from a package;
(5) network information for acquiring data from a network;
(6) access control information for receiving particular information; and
(7) other information.

It should be noted that the broadcast link information, the package information, and the network information are adapted to contain an access key associated with access control and encryption information associated with encryption. Also, the package information is adapted to include package identification information for identifying a particular package. The network information is also adapted to include user information that allows access to an information providing device connected by an access-limited server or network.

It should also be noted that the data to be used in the present invention may have a ciphertext block in which encrypted data is stored and a plaintext block for use when ciphertext cannot be decoded.

The terminal device practiced as one preferred embodiment of the present invention comprises:
(1) a data broadcast receiving block for receiving data from data broadcasting;
(2) a package data acquiring block for acquiring data from a package;
(3) a network data acquiring block for acquiring data from a server;
(4) a broadcasting link processing block for switching between television programs;
(5) a display block for display data;
(6) an access control block for controlling an access key;
(7) a filtering block for selecting data; and
(8) a ciphertext processing block for processing hypertext.

The terminal device acquires the above-mentioned data from any of the data broadcasting receiving block, the package data acquiring block, and the network data acquiring block. The acquired data is passed to the filtering block that selects only particular data by use of the access key controlled by the access control block and the filter information of the acquired data. The data selected by the filtering block is displayed on the screen of the display block. At this moment, the broadcast link information, the package information, and network information included in this data are displayed as links. When the user selects one of the links, desired data is acquired through a corresponding means. If an access key is included in the acquired data, the package data acquiring block, the network data acquiring block, and the broadcast link processing block add the access key to the access control block. This constitution allows acquisition of only particular data when particular data is acquired.

It should be noted that the display block is also adapted to display in one screen the data acquired by the data broadcast receiving block, the package data acquiring block, and the network data acquiring block.

Further, if data to be acquired is encrypted, the ciphertext processing block decodes a ciphertext block if encryption information is given; if not, the ciphertext processing block uses a plaintext block.

If user information is included in the network information, the network data acquiring block sends the user information to the information providing device connected by server or network at requesting the information providing device for data, so that the information can be read from the information providing device connected by access-limited server or network only when a particular link is followed.

Thus, the technical concept of the present invention has been fully described to be understood by those skilled in the art. However, the present invention is not by any manner limited to the description made above but is solely determined by the appended claims.

BRIEF DESCRIPTION OF THE DRAWINGS

These and other objects of the invention will be seen by reference to the description, taken in connection with the accompanying drawing, in which:

FIG. 5 is a diagram illustrating an example of media-integrating data description for use in the media-integrating system according to the present invention;

FIG. 7 is a diagram illustrating an example of description of a ciphertext block and a plaintext block for use in the media-integrating system according to the present invention;

FIG. 8 is a diagram illustrating a data structure of filter information for use in the media-integrating system according to the present invention, practiced as one preferred embodiment thereof;

FIG. 15 is a diagram illustrating a message for prompting insertion of a package for use in the media-integrating system according to the present invention, the message being practiced as one preferred embodiment thereof;

FIG. 20(a) is a diagram illustrating, in detail, a data structure for use in the media-integrating system according to the present invention, the data being practiced as a first preferred embodiment thereof;

FIG. 20(b) is a diagram illustrating, in detail, a first description example of a media-integrating data description for use in the media-integrating system according to the present invention;

FIG. 22(a) is a diagram illustrating, in detail, a data structure for use in the media-integrating system according to the present invention, practiced as a second preferred embodiment thereof;

FIG. 22(b) is a diagram illustrating, in detail, a second description example of a media-integrating data description for use in the media-integrating system according to the present invention;

DETAILED DESCRIPTION OF PREFERRED EMBODIMENTS

This invention will be described in further detail by way of example with reference to the accompanying drawings.

First, a constitution of a system according to the present invention will be described with reference to FIG. 1.

Figure 1:
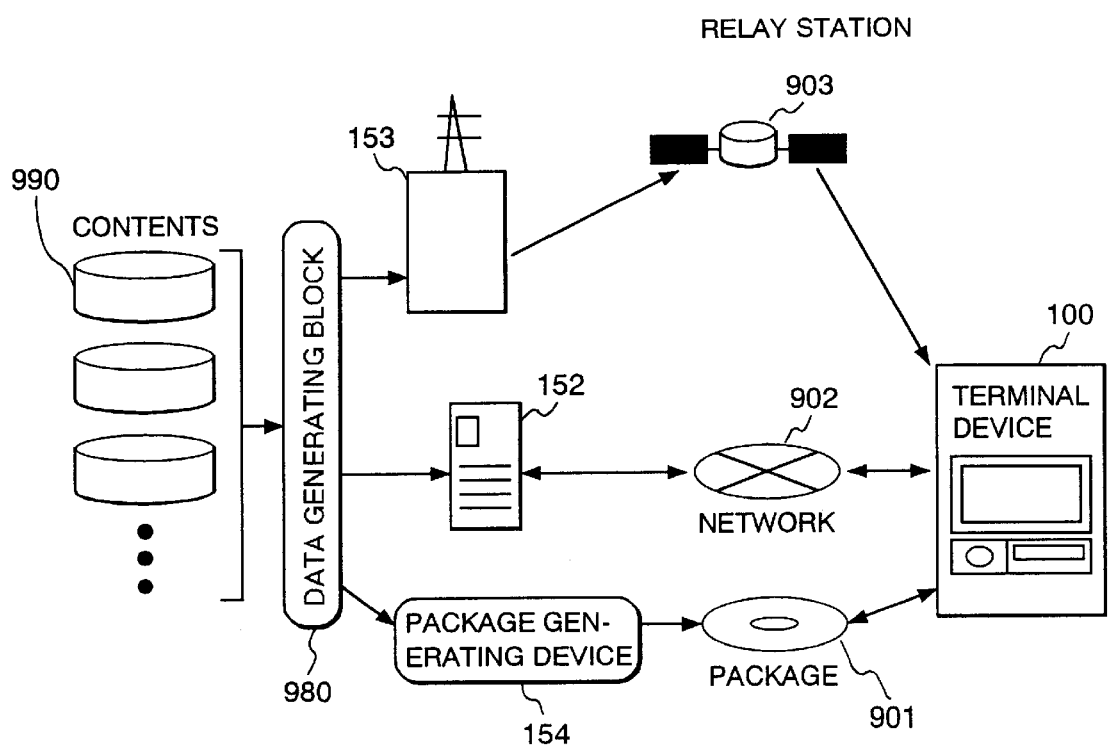
FIG. 1 is a schematic diagram illustrating an overall constitution of a media-integrating system practiced as one preferred embodiment of the present invention.

Referring to FIG. 1, there is shown an overall constitution of a media-integrating system practiced as one preferred embodiment of the present invention.

As shown in the figure, content 990, which is information or a program to be distributed to users is generated by a data generating block 980. This content 990 is divided into data to be sent by broadcasting, data to be provided by telecommunication (a network), and data to be electronically catalogued or published in a package. The data to be broadcast is sent from a broadcasting station 153 to a terminal device 100 via a relay station 903 for satellite broadcasting or terrestrial broadcasting for example. It should be noted that the data to be broadcast may be or may not be superimposed with television video and/or voice signals. The data to be provided by a network 902 is a home page for example, which is stored in a server 152 and distributed to the terminal device 100 via the network 902 such as a telephone line. A package 901 denotes a portable data storage medium such as a CD-ROM, a DVD-ROM, or a floppy disc. The data to be provided in the package 901 is generated by a package generating block 154, published stored in the package 901, and delivered to the terminal device 100. For the package 901, there may be an electronic magazine or an electronic catalog for example. Then, the terminal device 100 receives data from the broadcasting station 153 directly or via the relay station 903. Also, the terminal device 100 is connected to the server 152 via the network 902 for data transfer. Further, the terminal device 100 can read data from the package 901 and write data thereto. Thus, according to the present invention, the terminal device 100 can access data without restriction stored in the media (information providing media or information providing devices) of three types.

Figure 2:
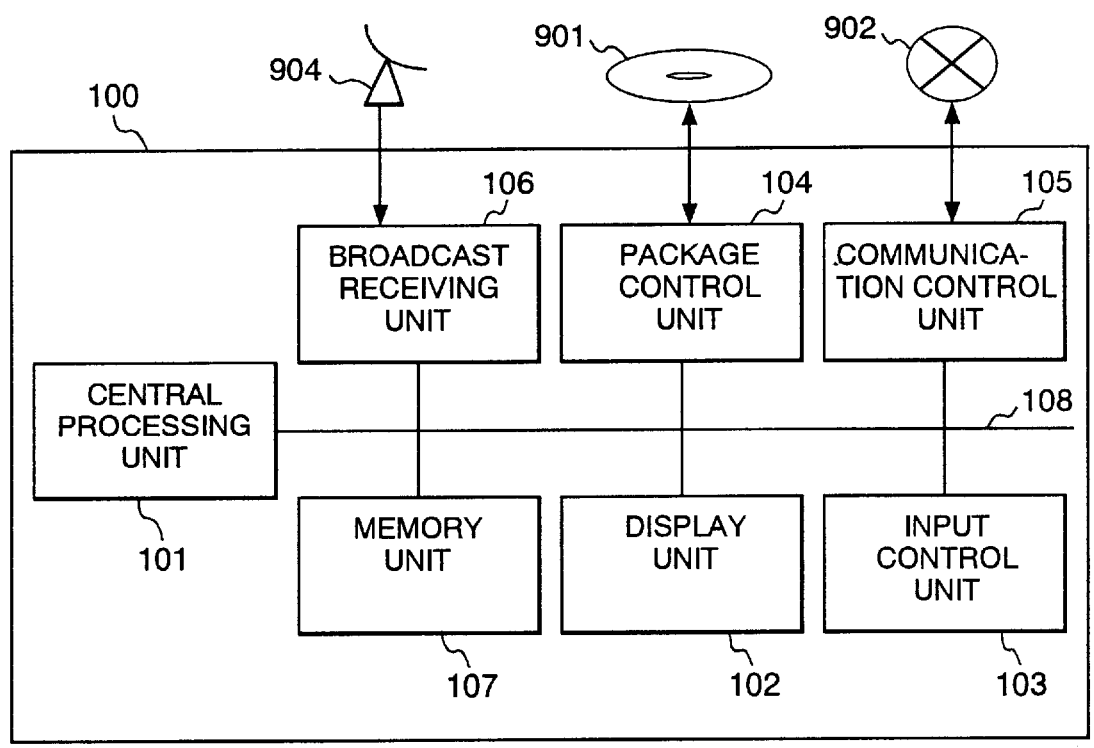
FIG. 2 is a block diagram illustrating a terminal device of the media-integrating system according to the present invention, practiced as one preferred embodiment thereof.

The following describes a constitution of the terminal device 100 for use in the media-integrating system according to the present invention with reference to FIG. 2.

Referring to FIG. 2, there is shown a block diagram illustrating the terminal device of the media-integrating system according to the present invention, the terminal device being practiced as one preferred embodiment thereof.

The terminal device 100 comprises a central processing unit 101, a display block 102, an input control block 103, a package control block 104, a communication control block 105, a broadcast receiving block 106, a memory block 107, and a buffer 108.

The display block 102 is based on a CRT or a liquid crystal display device and presents data display to the user. The input control block 103 receives inputs made by the user and is composed of a remote commander, its receiver, a keyboard, and a mouse by way of example. The package control block 104 reads data from the package 901 and writes data thereto. If the package is a disc, this block reads data from the disc or writes data thereto and therefore this block is a CD-ROM drive or a DVD-RAM drive by way of example. The communication control block 105 communicates with the server 152 via the network 902 and is a modem by way of example. The broadcast receiving block 106 receives a broadcast wave from the relay station 903 to extract video signals and data and is a receiver for digital satellite broadcasting by way of example. The broadcast receiving block 106 separates television video and audio signals and data from the received broadcast waves. It should be noted that the broadcast receiving block 106 is connected to an antenna 904. The memory block 107 includes a RAM, a ROM, and a hard disk unit for example for storing programs and data associated with the embodiments of the present invention. The central processing unit 101 controls program execution and peripheral device operations. The bus 108 interconnects the central processing unit 101 and the peripheral devices including the broadcast receiving block 106, the display block 102, the controls blocks 103 through 105, and the memory block 107.

It should be noted that the blocks 101 through 106 constituting the terminal device 100 may be accommodated in one housing or in two or more housings interconnected by signal lines or the like.

Figure 3:
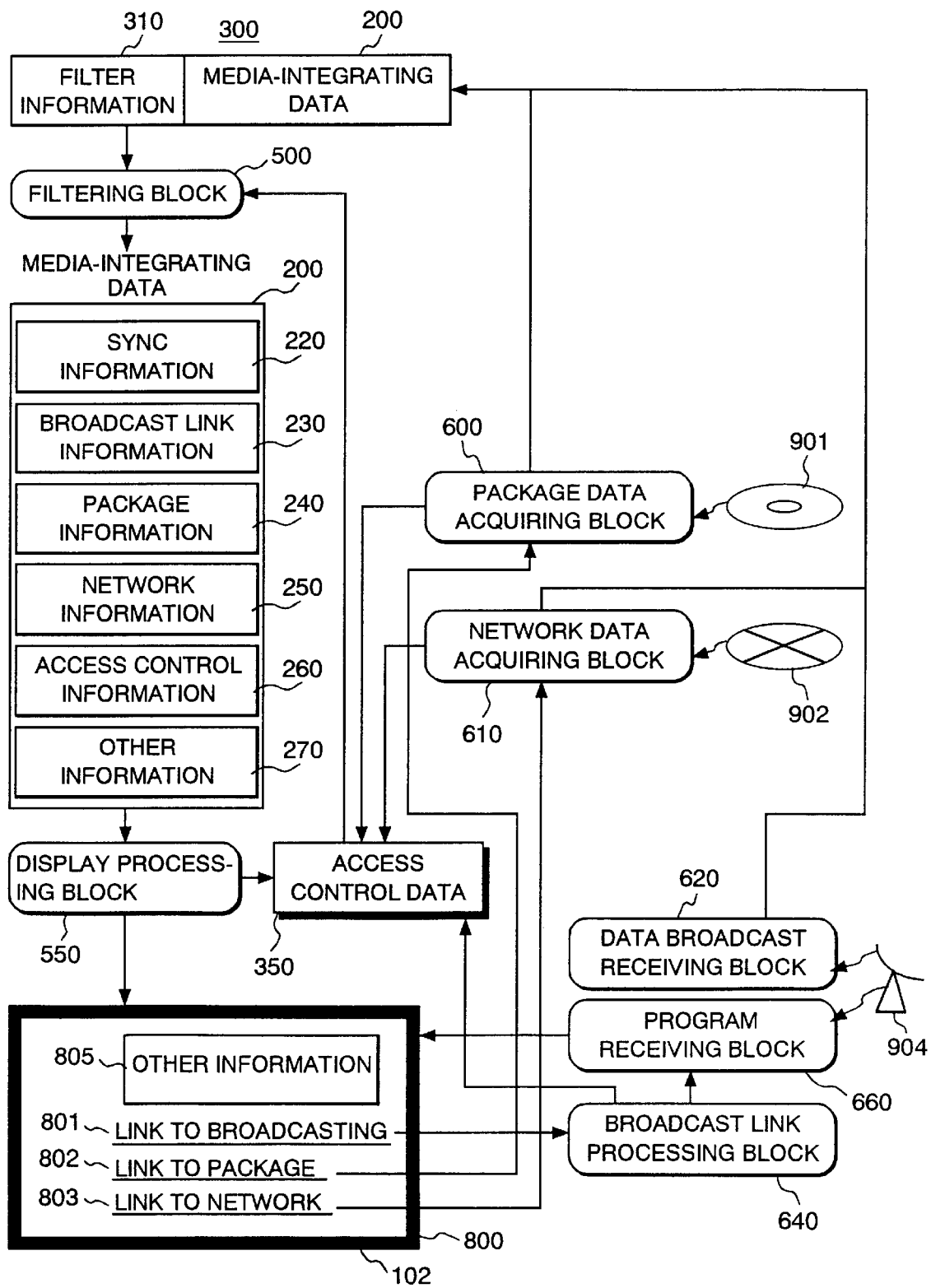
FIG. 3 is a block diagram illustrating an outline of processing by the terminal device of the media-integrating system according to the present invention, practiced as one preferred embodiment thereof.

The following describes the outline of processing to be performed in the terminal device 100 with reference to FIG. 3.

Referring to FIG. 3, there is shown a block diagram illustrating the processing by the terminal device of the media-integrating system according to the present invention, the processing being practiced as one preferred embodiment thereof.

The terminal device 100 receives data 300 through processing of one of a package data acquiring block 600, a network data acquiring block 610, and a data broadcast receiving block 620. The received data 300 is filtered by a filtering block 500 and media-integrating data 200 obtained by deleting filter information 310 is supplied to a display processing block 550. The display processing block 550 displays the content of the media-integrating data onto a screen 800 of the display block 102. On the screen 800 displaying the media-integrating data 200, broadcast link information 230 included in the media-integrating data 200 is displayed as a link 801 to broadcast, package information 240 is displayed as a link 802 to package, and network information 250 is displayed as a link 803 to network. When the user selects the link 801 to broadcast, a broadcast link processing block 640 is activated. When the user selects the link 802 to package, a package data acquiring block 600 is activated. When the user selects the link 803 to network, the network data acquiring block 601 is activated. Then, the data 300 is read again to be processed in the same manner. A program receiving block 660 performs program reservation and program receiving processing, a processing result being displayed on the screen 800.

Figure 4:
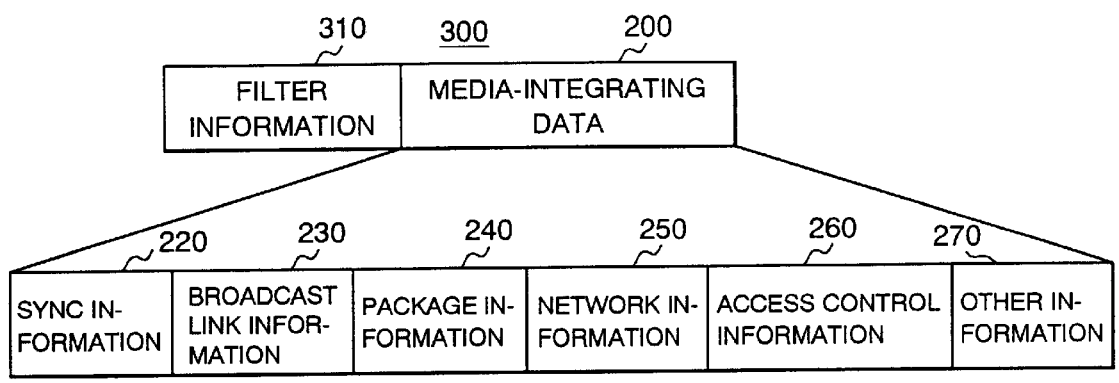
FIG. 4 is a diagram illustrating a data structure of media-integrating data for use in the media-integrating system according to the present invention, practiced as one preferred embodiment thereof.

The following describes a data structure for use in the present invention with reference to FIG. 4.

Referring to FIG. 4, there is shown a diagram illustrating a data structure of media-integrating data for use in the media-integrating system according to the present invention, the data structure being practiced as one preferred embodiment thereof.

In the figure, the data 300 is composed of the filter information 310 and the media-integrating data 200.

The media-integrating data 200 is composed of synchronization information 220, broadcast link information 230, package information 240, network information 250, access control information 260, and other information 270. The other information 270 includes shopping information and hotel reservation information for example. The following describes a constitution of each of the above-mentioned pieces of information.

The synchronizing information 220 shown in FIG. 4 (a) is composed of channel 221, date 222, and time 223. The channel 221 is an identifier, for example a channel number, of a channel for displaying this media-integrating data 200. The date 222 is a date on which the data is displayed. The time 223 is a time at which the data is displayed. For example, if the channel 221 is "100," the date 222 is "Dec. 12, 1996," and the time 223 is "10:10:10," then, this media-integrating data 200 can be viewed when the user is viewing a program on channel 100 at 10 seconds, 10 minutes past 10 on Dec. 12, 1996.

The broadcast link information 230 shown in FIG. 4 (b) is composed of type 239, channel 231, date 232, time 233, broadcasting time 234, access key 235, and PPV (Pay Per View=a system in which the user is charged for every program he or she viewed) free key 236. The type 239 specifies whether to switch to a particular channel identified by the channel 231 at a time explicitly instructed by the user (this is called link) or automatically acquire information identified by the channel 231 and embed the acquired information into the media-integrating data 200 for display (this is called embed). "Link" is a capability of displaying information linked to another when it is clicked by the user. "Embed" is a capability of displaying information upon transmission. The channel 231 is a channel identifier. The date 232 is a date on which a particular program is broadcast. The time 233 denotes a time at which broadcasting of the program starts. The broadcasting time 234 is a duration of time in which the program is broadcast. The access key 235 is an access key that is obtained when the user followed this link. How to use this access key will be described in the description of the filtering block 500. The PPV free key 236 is information for making free of charge a PPV program when the user viewed the program by following this link.

The package information 240 shown in FIG. 4 (c) is composed of type 249, file name 241, package ID 242, package name 243, decipher key 244, access key 245, and PPV free key 246. The type 249 specifies whether to acquire information at a time explicitly specified by the user to display the acquired information (link) or automatically acquire information designated by the file name 241 and embed the acquired information in the media-integrating data 200 for display (embed). The file name 241 is an identifier for the information to be retrieved. The package ID 242 is an identifier for identifying the package 901 storing the information designated by the file name 241. The package name 243 is a name of the package 901 designated by the package ID 242. The decipher key 244 deciphers the information written in ciphertext designated by the file name 241. The access key 235 and the PPV free key 246 provide the same capabilities as those of the access key 235 and the PPV free key 236 included in the broadcast link information 230.

The network information 250 shown in FIG. 4(d) is composed of type 259, URL (Universal Resource Locator) 251, user ID 252, password 253, decipher key 254, access key 255, and PPV free key 256. The type 259 specifies whether to acquire information designated by the URL 251 at a time explicitly specified by the user to display the acquired information (link) or automatically acquire information designated by the URL 251 and embed the acquired information in the media-integrating data 200 for display (embed). "Link" or "embed" can be specified by the type 259. The URL 251 is an identifier for information to be acquired on the network. The user ID 252 and the password 253 are the user identifier and its password to be used when access to information designated by the URL 251 is limited to a particular user. The decipher key 254 is used to decipher information designated by the URL 251 when the information is written in ciphertext. The access key 255 and the PPV free key 256 provide the same capabilities as those of the access key 235 and the PPV free key 236 included in the broadcast link information.

The access control information shown in FIG. 4(e) is composed of access key 261 and PPV free key 262. These keys 261 and 262 provide the same capabilities as those of the access key 235 and the PPV free key 236 included in the broadcast link information 230.

The other information 270 includes information other than those included in the media-integrating data 200 mentioned above.

It should be noted that the media-integrating data 200 does not always include all of the synchronizing information 220, the broadcast link information 230, the package information 240, the network information 250, the access control information 260, and the other information 270. The broadcast link information 230 must include the type 239 and the channel 231, the package information 240 must include the type 249 and the file name 241, the network information 250 must include the type 259 and the URL 251. The information other than these may be added as required.

In the above-mentioned example, the media-integrating data 200 contains one piece of synchronizing information 220, one piece of broadcast link information 230, one piece of package information 240, one piece of network information 250, and one piece of access control information 260. It will be apparent that two or more pieces of each of these information may be included in the media-integrating data 200.

The following describes an example of expressing the media-integrating data 200 written according to HTML (HyperText Markup Language) with reference to FIG. 5.

Referring to FIG. 5, there is shown a description example of the media-integrating data for use in the media-integrating system according to the present invention. In the figure, HTML generally denotes a language by which contents on the Internet are described. In the description based on HTML, tag "A" is used when the type 249 of the package information 240 is "link" and when the type 249 is "imbed," a tag such as "IMG" or "EMBED" for specifying acquisition of data from an information source other than a file being displayed. This holds same with the broadcast link information 230 and the network information 250. It should be noted that, in the present embodiment, a still picture is displayed when the "IMG" tag is used and a moving picture is displayed when the "EMBED" tag is used.

In the example of FIG. 5, the "A" tag is used for the broadcast link information 230, the package information 240, and the network information 250. It should be noted that distinction between the broadcast link information 230, the package information 240, and the network information 250 is made by an HREF parameter for designating link destination information in the "A" tag. For example, if the value of the HREF parameter starts with "tv:", it indicates the broadcast link information 230; if the value of the HREF parameter starts with "file:", it indicates the package information 240; and if the value of the HREF parameter starts with "http:", it indicates the network information 250. If a relative path is specified, it indicates information for linking to the same medium as a currently displayed page. The synchronizing information 220 uses a "BCInfo" tag and the access control information 260 uses a "IMinfo" tag for information identification.

In the synchronizing information 220, the channel 221 corresponds to "ch" parameter, the date 222 corresponds to "date" parameter, and the time 223 corresponds to "time" parameter.

In the broadcast link information, the type 239 corresponds to the "A" tag, the channel 231 to the "HREF" parameter, the date 232 to the "date" parameter, the time 233 to "starttime" parameter, the broadcast time 234 to "length" parameter, the access key 235 to "AccessKey" parameter, and the PPV free key 236 to "PpvFree" parameter.

In the package information 240, the type 249 corresponds to the "A" tag, the file name 241 to the "HREF" parameter, the package ID 242 to "PackageID" parameter, the package name 243 to "PackageName" parameter, the decipher key 244 to "decipher" parameter, the access key 245 to "AccessKey" parameter, and the PPV free key 246 to the "PpvFree" parameter.

In the network information 250, the type 259 corresponds to the "A" tag, the URL 251 to the "HREF" parameter, the user ID 252 to "LoginID" parameter, the password 253 to "LoginPass" parameter, the decipher key 254 to the "decipher" parameter, the access key 255 to the "AccessKey" parameter, and the PPV free key 256 to the "PpvFree" parameter.

In the access control information 260, the access key 261 corresponds to the "AccessKey" parameter and the PPV free key 262 to the "PpvFree" parameter.

Figure 6:
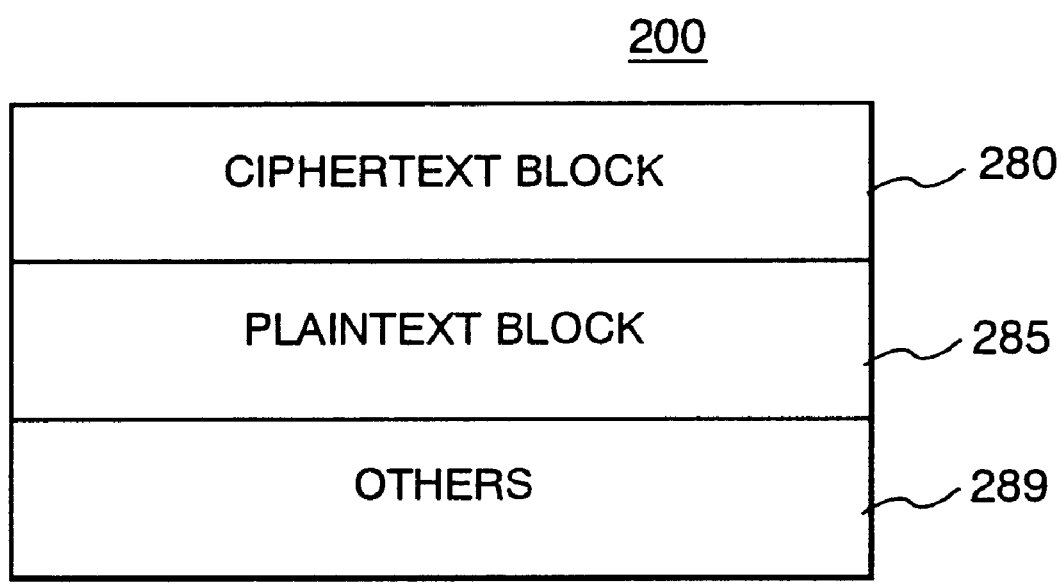
FIG. 6 is a diagram illustrating a data structure of media-integrating data for use in the media-integrating system according to the present invention.

The following describes a data structure of the media-integrating data 200, a part of which is ciphered, with reference to FIG. 6.

Referring to FIG. 6, there is shown a diagram illustrating a data structure of the media-integrating data for use in the media-integrating system according to the present invention.

The ciphered media-integrating data 200 is composed of a ciphertext data block 280, a plaintext data block 285, and others. The ciphertext data block 280 stores ciphered information. The plaintext data block 285 stores information to be used when the information in the ciphertext data block 280 cannot be deciphered.

The following describes an example of the ciphered media-integrating data 200 described by HTML with reference to FIG. 7.

Referring to the FIG. 7, there is shown a description example of a ciphertext data block and a plaintext data block for use in the media-integrating system according to the present invention.

The ciphertext data block 280 is enclosed with a "CIPHER" tag and a "/CIPHER" tag for example and the plaintext data block 285 is enclosed with a "NOCIPHER" tag and a "/NOCIPHER" tag for example.

The "CIPHER" tag has a "method" parameter and an "encode" parameter. Information associated with an algorithm of ciphering is specified in the "method" parameter. An algorithm for converting the ciphered data into a plaintext format is specified in the "encode" parameter. Namely, in order to decode the data enclosed by the "CIPHER" tag and the "/CIPHER" tag, the data of plaintext form may be converted into data of binary form according to the algorithm specified in the "encode" parameter and then the binary data may be decoded by the algorithm specified in the "method" parameter.

The following describes a data structure of the filter information 310.

Referring to FIG. 8, there is shown a diagram illustrating a data structure of filter information for use in the media-integrating system according to the present invention, the data structure being practiced as one preferred embodiment thereof.

The filter information 310 lists access keys required for accessing the media-integrating data 300.

Figure 9:
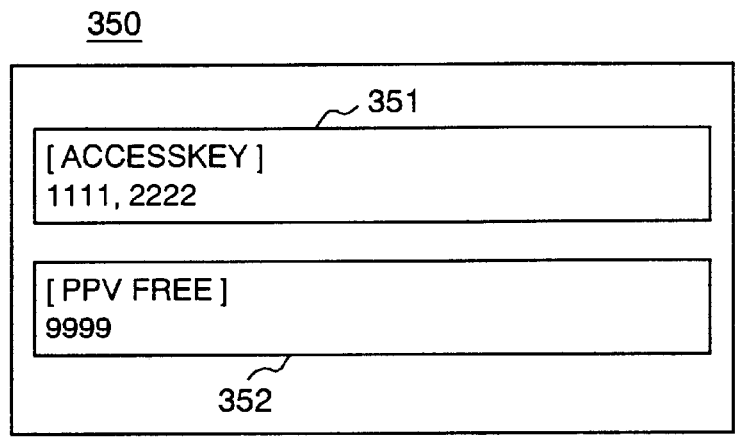
FIG. 9 is a diagram illustrating a data structure of access control data for use in the media-integrating system according to the present invention, practiced as one preferred embodiment thereof.

The following describes a structure of access control data with reference to FIG. 9.

Referring to FIG. 9, there is shown a diagram illustrating a data structure of access control data for use in the media-integrating system according to the present invention, the data structure being practiced as one preferred embodiment thereof.

Access control data 350 is composed of an access key control part 351 and a PPV free key control part 352. The access key control part 351 lists access keys acquired by the user. The PPV free key control part 352 lists PPV free keys acquired by the user.

Figure 10:
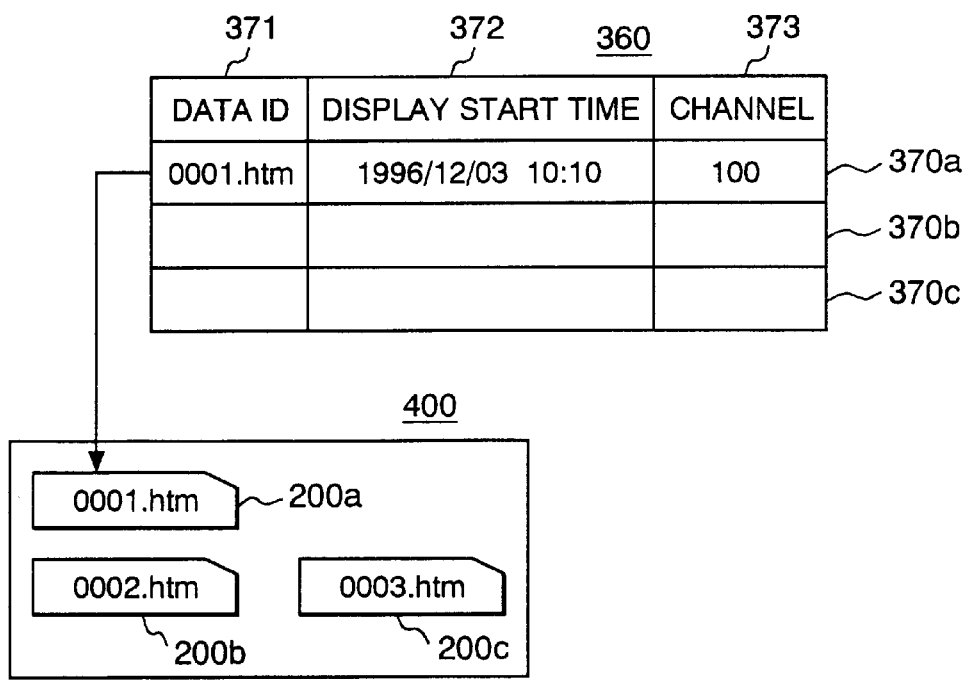
FIG. 10 is a diagram illustrating a data structure of display time control table for use in the media-integrating system according to the present invention, practiced as one preferred embodiment thereof.

The following describes a structure of a display time control table 360 for controlling the timing of displaying the media-integrating data 200 with reference to FIG. 10.

Referring to FIG. 10, there is shown a diagram illustrating a data structure of the display time control table for use in the media-integrating system according to the present invention, the table being practiced as one preferred embodiment thereof.

The display time control table 360 is a collection of more than zero display time control records 370a, 370b, 370c, and so on for example.

Each of the display time control records 370a, 370b, and 370c consists of a data ID 371, a display start time 372, and a channel 373. The data ID 371 is an identifier of the media-integrating data 200 to be displayed. It should be noted that media-integrating data 200a, 200b, and 200c to be displayed are stored in a data storage block 400 in the memory block 107. The display start time 372 denotes a time at which the media-integrating data 200 designated by the data ID 371 is displayed. The channel 373 is a channel identifier. When the channel 373 is "100" and the start time 372 is "Dec. 12, 1996 10:10:10," if the user is viewing a program on the channel 100, the media-integrating data 200 designated by the data ID 371 is displayed at 10 seconds, 10 minutes past 10 on Dec. 12, 1996.

Figure 11:
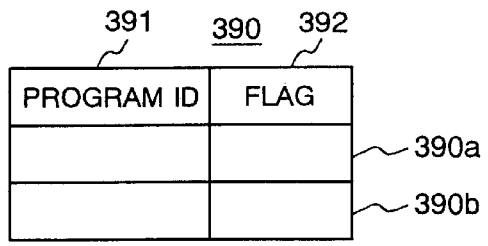
FIG. 11 is a diagram illustrating a data structure of a billing control table for use in the media-integrating system according to the present invention, practiced as one preferred embodiment thereof.

The following describes a structure of a billing control table 390 with reference to FIG. 11.

Referring to FIG. 11, there is shown a diagram illustrating a data structure of the billing control table for use in the media-integrating system according to the present invention, the data structure being practiced as one preferred embodiment thereof.

The billing control table 390 is a collection of more than zero billing control records, 390a, 390b, and so on for example. Each of the billing control records 390a and 390b is composed of a program ID 391 and a flag 392. The program ID 391 is a program identifier. The flag 392 indicates whether PPV charge is made free of charge or not. For example, if this flag is "11", it indicates that the program is made free of charge; if "0", it indicates that the program is not made free of charge.

The following describes the processing to be performed on the terminal device 100 by use of the data mentioned above.

First, the filtering block 500 to be activated when the data 300 is received from the package 901, the network 902, or from the broadcast wave transmitted from the relay station 903 will be described with reference to FIG. 12.

Figure 12:
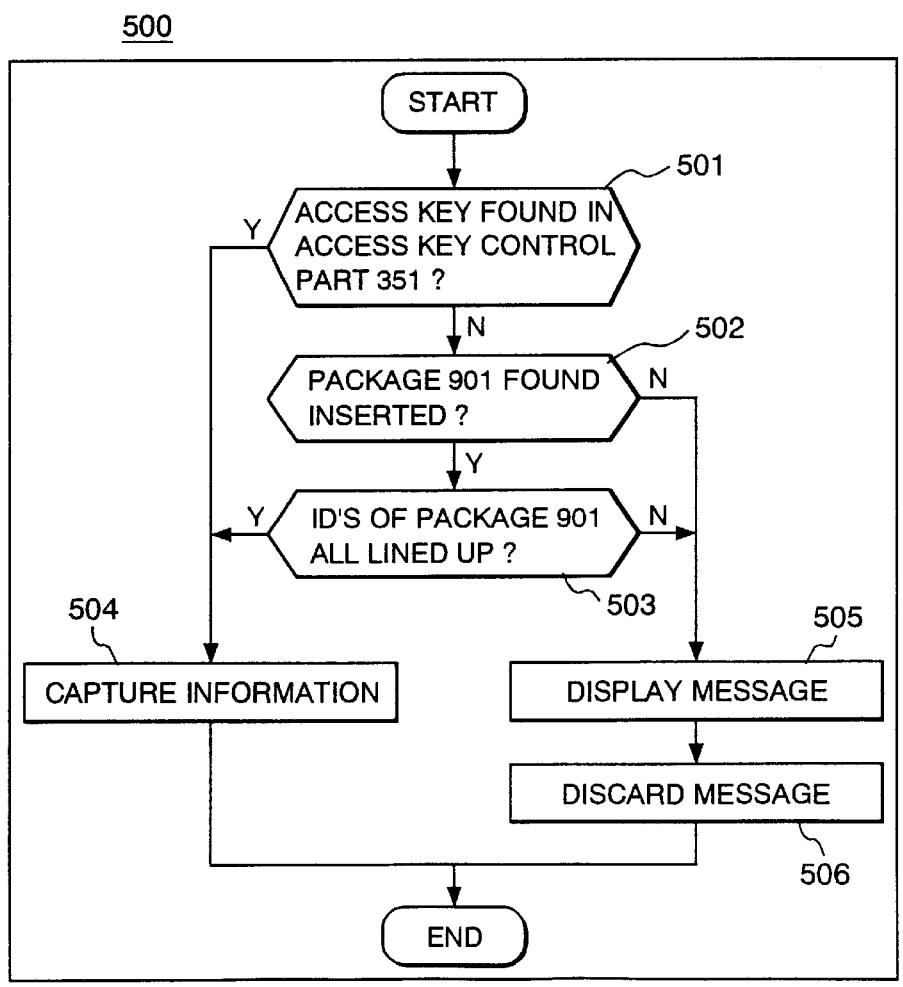
FIG. 12 is a flowchart indicative of an outline of filter processing of the media-integrating system according to the present invention, the filter processing being practiced as one preferred embodiment thereof.

Referring to FIG. 12, there is shown an outline of the filter processing of the media-integrating system according to the present invention, the filter processing being practiced as one preferred embodiment of thereof.

The filtering block 500 filters the data 300 by the filter information 310.

First, in step 501, the filtering block 500 checks if all of the access keys listed in the filter information 310 exist in the access key control part 351 (refer to FIG. 9) of the access control data 350. If all of the access keys are found, then in step 504, the filtering block 500 captures the media-integrating data 200 with the filter information 310 (refer to FIG. 8) removed from the data 300. If all of access keys are not found, then in step 502, the filtering block 500 checks whether the package 901 is inserted or not. If the package 901 is not inserted, then in step 505, the filtering block 500 displays that the package is not inserted. If the package 901 is inserted, then in step 503, the filtering block 500 regards the identifier of the package 901 as its access key. Then, the filtering block 500 checks whether all access keys listed in the filter information 310 come to exist if the regarded access key is added to the access keys listed in the access key control part 351. If all access keys are lined up, then in step 504, the filtering block 500 captures information. If not, then in step 505, the filtering block 500 displays a message to the user that the acquired data 300 will be discarded.

It should be noted that, is the message display in step 505 is skipped, the data 300 may also be discarded without making the user aware of it.

It should also be noted that the identifier of the package 901 need not always be checked. If the identifier is not checked, then step 501, if all access keys listed in the filter information 310 do not exist in the access key control part 351 of the access control data 350, the filtering block 500 may go to step 505.

The access keys controlled by the access key control part 351 are stored in the access key control part 351 when the filtering block 500 accesses particular data, as will be described later. Therefore, it is enabled that only when the filtering block 500 accesses particular data, that particular data can be received.

It should be noted that if the filter information 310 is not included in the data 300, the processing by the filtering block 500 may be skipped.

Figure 13:
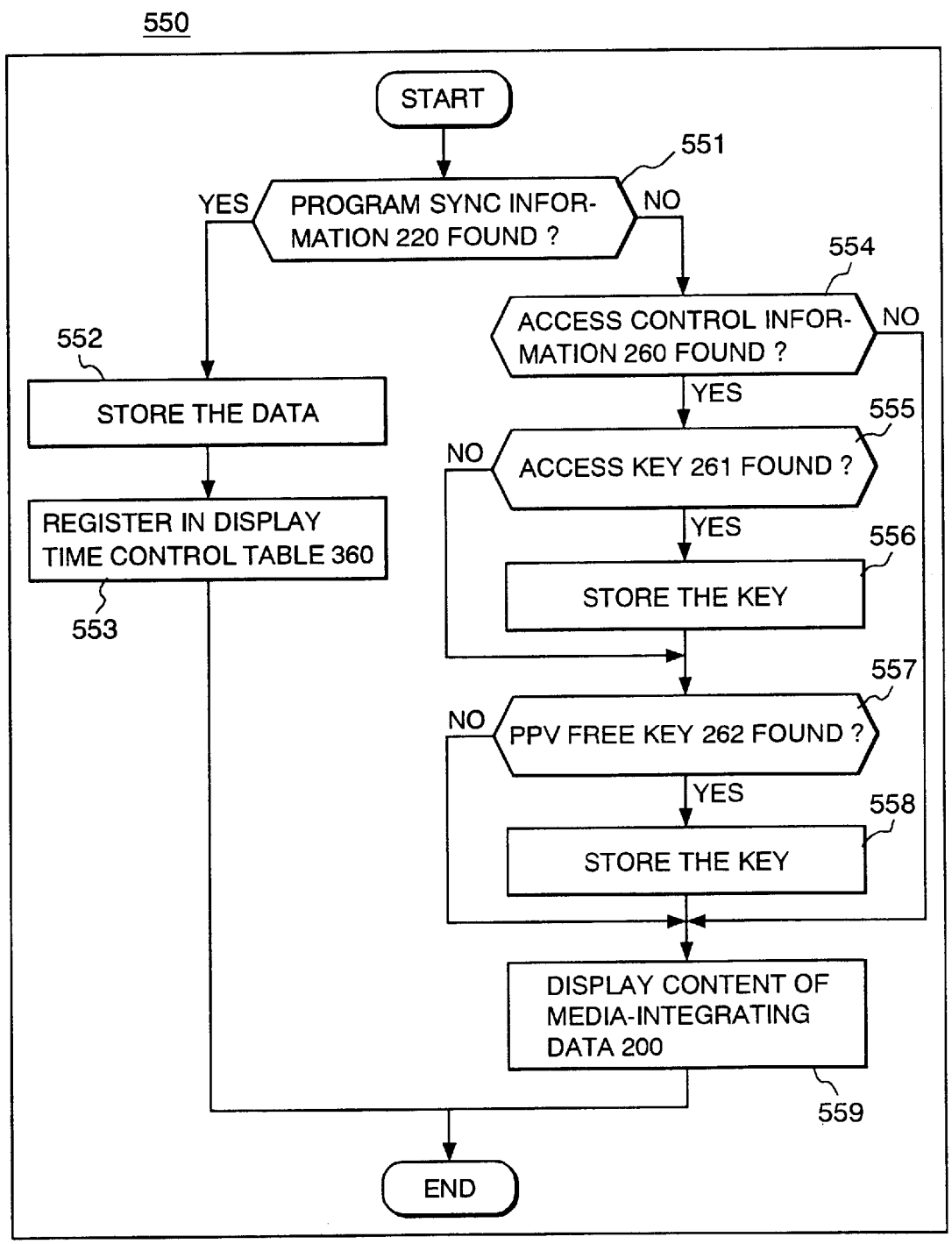
FIG. 13 is a flowchart indicative of display processing of the media-integrating system according to the present invention, the display processing being practiced as one preferred embodiment thereof.

The following describes the processing of the display processing block 550 to be performed when the media-integrating data 200 is selected by the filtering block 500 with reference to FIG. 13.

Referring to FIG. 13, there is shown a diagram illustrating an outline of display processing of the media-integrating system according to the present invention, the processing being practiced as one preferred embodiment thereof.

First, in step 551, the display processing block 550 checks the media-integrating data to be displayed for synchronizing information 220. If the synchronizing information 220 is not included, then in step 554, the display processing block 550 checks whether the access control information 260 exists or not. If the access control information 260 is not found, then in step 559, the display processing block 550 checks whether the access key 261 exists or not. If the access key 261 is not found, the display processing block 550 goes to step 557. If the access key 261 is found, then in step 556, the display processing block 550 stores the access key 261 into the access key control part 351 of the access control data 350. Then, in step 557, the display processing block 550 checks whether the PPV free key 262 exists. If the PPV free key 262 is not found, then in step 559, the display processing block 550 displays thereof. If the PPV free key 262 is found, then in step 558, the display processing block 550 stores the PPV free key 262 into the PPV free key control part 352 of the access control data 350. Then, in step 559, the display processing block 550 displays the contents of the media-integrating data 200. It should be noted that, if the media-integrating data 200 is written in HTML, it is displayed according to the display rule of HTML. If the synchronizing information 220 is included in the media-integrating data 200, then in step 552, the display processing block 550 stores the media-integrating data 200 and the identifier into the data storage block 400 of the memory block 107. Then, instep 553, the display processing block 550 registers the identifier of the media-integrating data 200 attached in step 552 into the data ID 371 of the display time control table 360, registers the date 222 and the time 223 of the synchronizing information 220 into the display start time 372, and registers the channel identifier specified by the channel 221 into the channel 373.

For the display time control records 370a through 370c registered in the display time control table 360, the display processing block 550 checks, when the time designated by the display start time 372 comes, whether the channel designated by the channel 373 of the display time control table 360 is being received by the terminal device 100. If the channel is found received, the display processing block 550 performs the same processing as that subsequent to step 555. If the channel is not found received, the display processing block 550 discards that media-integrating data 200.

Thus, in one preferred embodiment of the invention, information can be provided only to those users who are viewing a particular program at a particular time.

Figure 14:
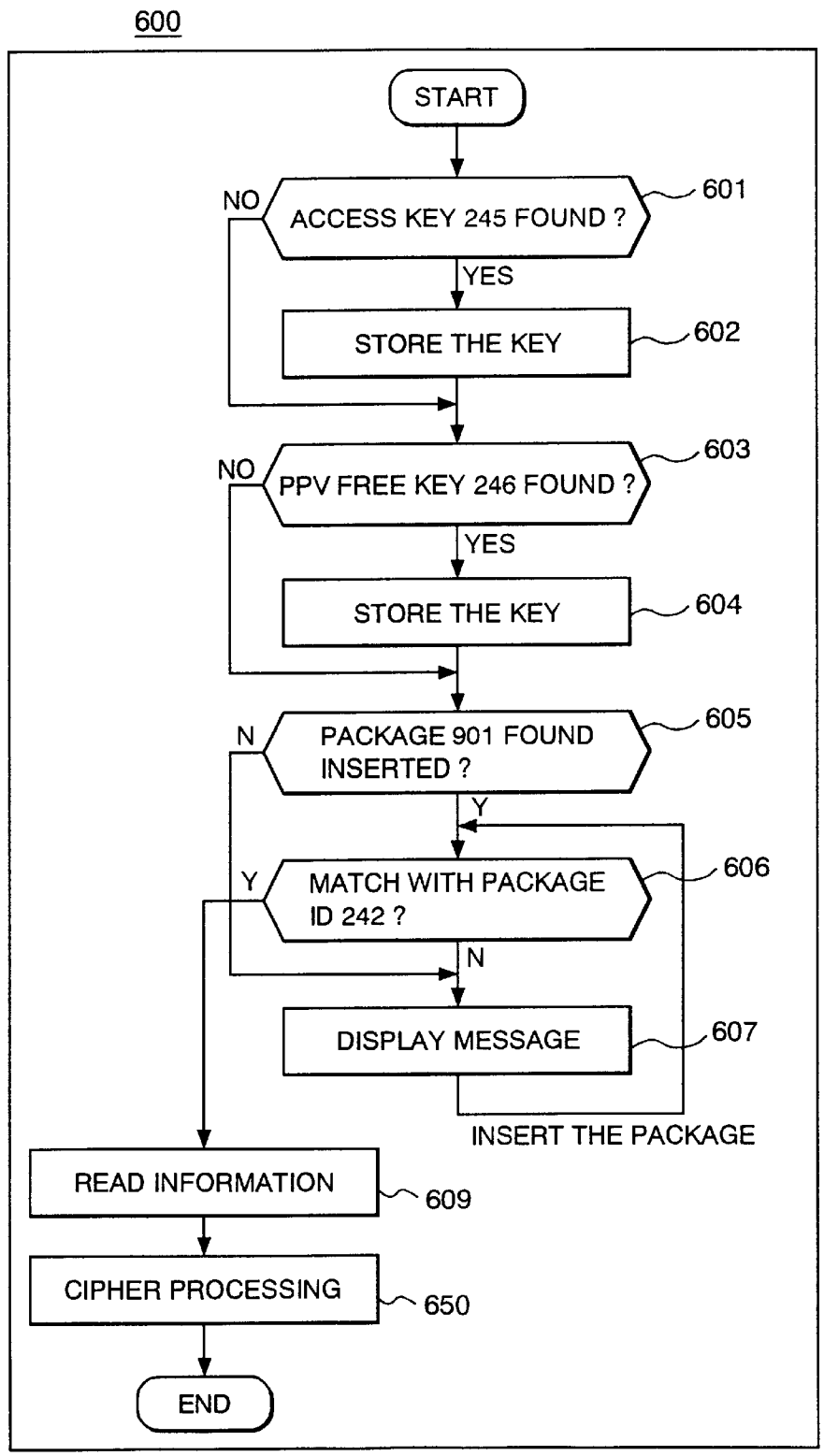
FIG. 14 is a flowchart indicative of an outline of package data acquiring processing of the media-integrating system according to the present invention, the package data acquiring processing being practiced as one preferred embodiment thereof.

The following describes, with reference to FIG. 14, the processing to be performed by the package data acquiring block 600 that is activated when the user selects the link 802 to package or when the type 249 of the package information 240 is "embed" and data acquisition from the package 901 is instructed.

Referring to FIG. 14, there is shown a flowchart outlining the package data acquiring processing of the media-integrating system according to the present invention, the processing being practiced as one preferred embodiment thereof.

First, in step 601, the package data acquiring block 600 shown in FIG. 3 checks whether the access key 245 (refer to FIG. 4) exists or not. If the access key 245 is not found, the package data acquiring block 600 goes to step 603. If the access key 245 is found, then in step 602, the package data acquiring block 600 stores the access key 245 into the access key control part 351 of the access control data 350. Next, regardless whether there is the access key 245 or not, the package data acquiring block 600 checks, in step 603, whether the PPV free key 246 exists or not. If the PPV free key 246 is not found, the package data acquiring block 600 goes to step 605. If the PPV free key 246 is found, then in step 604, the package data acquiring block 600 registers the PPV free key 246 into the PPV free key control part 352 of the access control data 350. Next, in step 605, the package data acquiring block 600 checks whether there is the package 901 inserted in the terminal device 100. If the package 901 is not found inserted, then in step 607, the package data acquiring block 600 displays thereof. If the package 901 is found inserted, then in step 606, the package data acquiring block 600 checks whether the package identifier matches the package ID 242. If no match is found, then in step 607, the package data acquiring block 600 displays a message prompting user to insert the package 901. A display example of this screen is shown in FIG. 15.

Referring to FIG. 15, there is shown the message for prompting the user to insert a package of the media-integrating system according to the present invention, the message being practiced as one preferred embodiment thereof.

As shown, the message in step 607 indicates the name of the package specified by the package name 243, so that the user can easily identify the package to be inserted. After step 607, the package data acquiring block 600 goes back to step 606. In step 606, if the identifier of the package 901 matches the package ID 242, then in step 609, the package data acquiring block 600 reads the information designated by the file name 241. Then, cipher processing is performed in step 650.

It should be noted that, FIG. 14 may be modified such that, if the package ID 242 is not found in the package information 240, the package data acquiring block 600 goes to step 609 if the package 901 is found inserted in step 605; if the package 901 is found inserted, the package data acquiring block 600 goes to step 607.

It is also possible that the information designated by the file name 241 of the package information 240 is not the media-integrating data 200. For example, the information may be a program and a parameter (data necessary for program execution) to be used by that program. Or the information may be a parameter of a program stored in the terminal device 100. If the acquired information is a program, the acquired program is executed instead of performing the cipher processing in step 650. If the acquired information is the parameter of the program stored in the terminal device 100, the parameter is passed to that program for execution.

Figure 16:
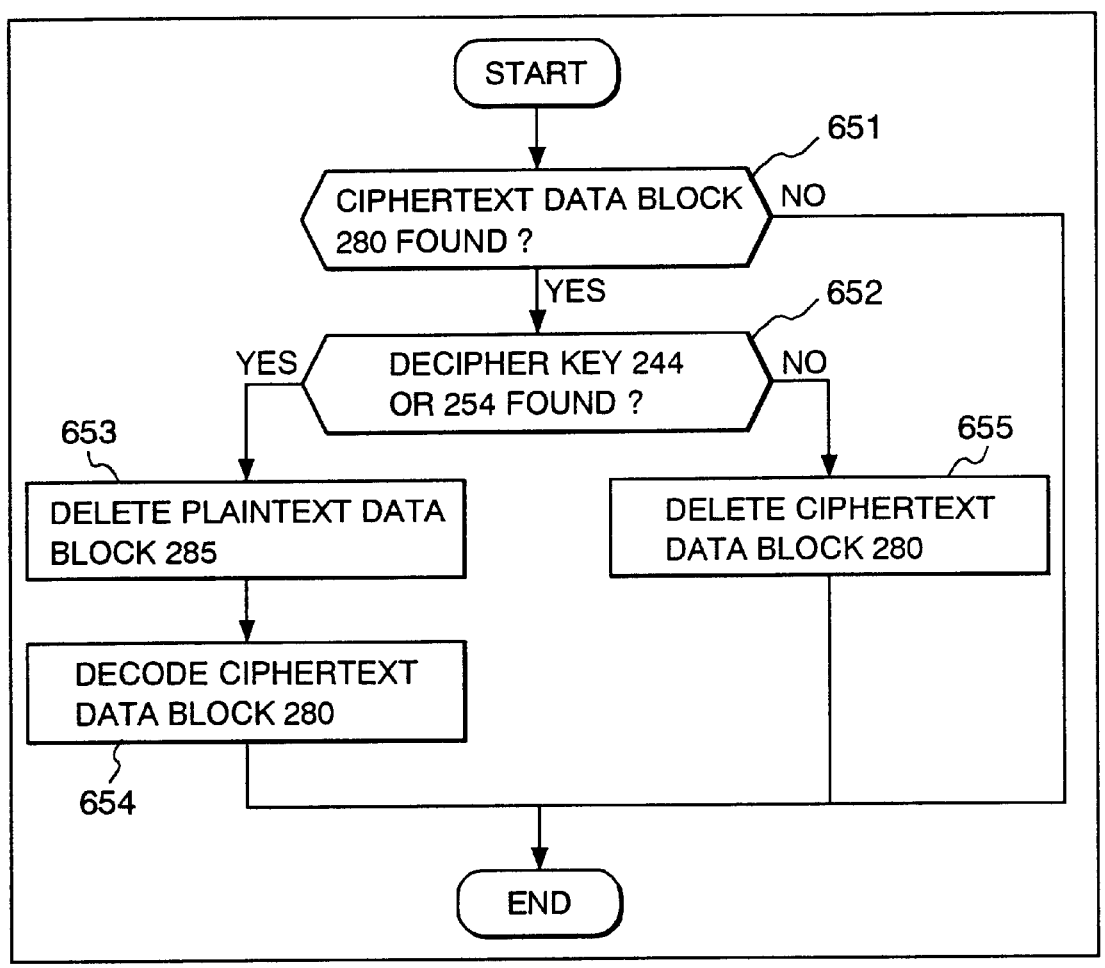
FIG. 16 is a flowchart indicative of an outline of encryption processing of the media-integrating system according to the present invention, the encryption processing being practiced as one preferred embodiment thereof.

The following describes the cipher processing of step 650 with reference to FIG. 16.

Referring to FIG. 16, there is shown a flowchart outlining the cipher processing of the media-integrating system according to the present invention, the cipher processing being practiced as one preferred embodiment thereof.

In FIG. 3, the cipher processing shown in FIG. 16 is performed in the package data acquiring block 600 or the network data acquiring block 610 for example.

In the cipher processing shown in step 650, it is first checked in step 651 whether the received data 300 contains the ciphertext data block 280. If the ciphertext data block 280 is not found, the cipher processing comes to an end. In the case of package information 240, it is checked in step 651 whether the decipher key 244 exits; in the case of network information 250, it is checked whether the decipher key 254 exists. If the decipher key 244 or 254 is found, then in step 653, the plaintext data block 285 is deleted from the media-integrating data 200. Then, in step 655, the ciphertext data block 280 is decoded by use of the decipher key 244 or 254. At this moment, if the "method" parameter is specified, the decoding is performed by use of the algorithm specified by the "method" parameter. If the "method" parameter is not specified, default method is used. If the "encode" parameter exists, the text data of the ciphertext data block 280 is converted into a binary form before decoding, by use of the algorithm specified by the "encode" parameter. If the "encode" parameter does not exist, the text data is converted into a binary form by use of default method. If neither the decipher key 244 nor the decipher key 254 is found in step 652, then the ciphertext data block 280 is deleted.

The above-mentioned cipher processing allows reading of ciphertext data only when the user specifies a link in which the information associated with the cipher key 244 or 254 is embedded. In any other cases, the ciphertext data cannot be read by the user.

Figure 17:
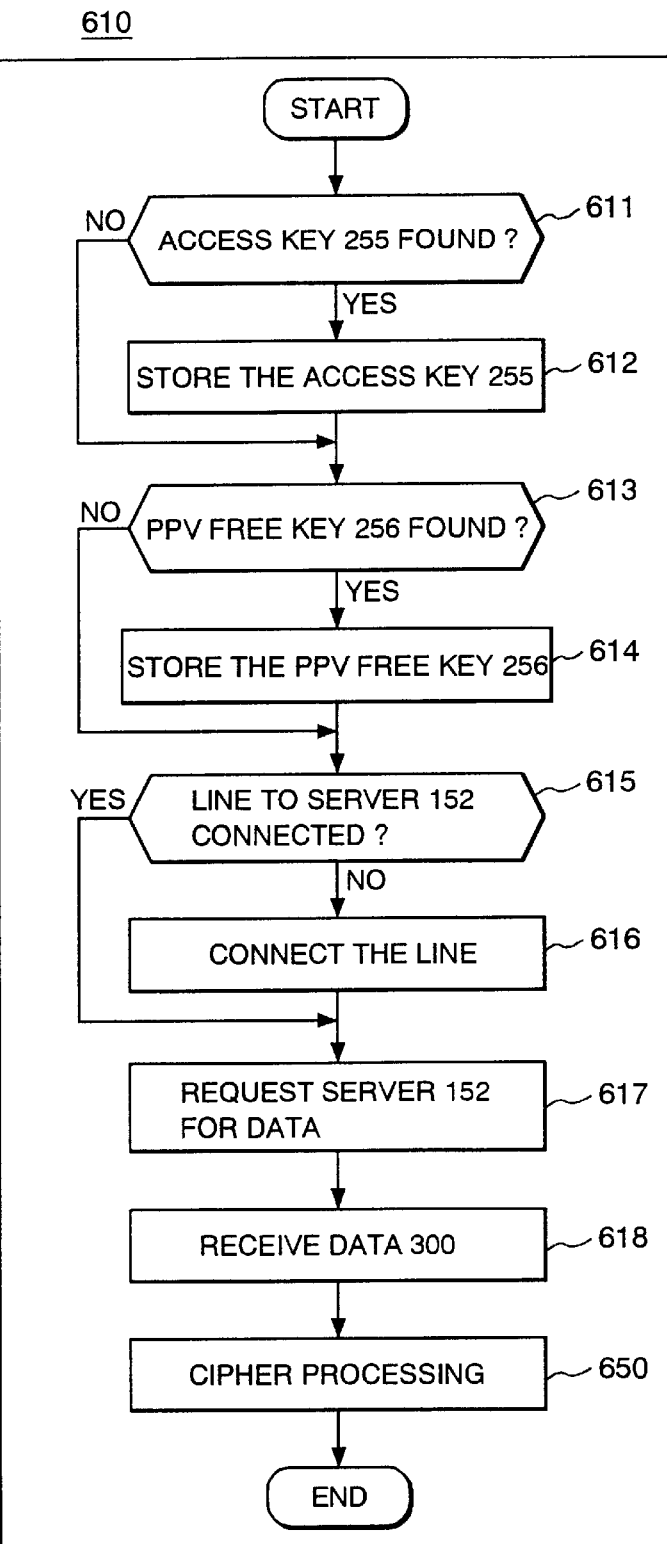
FIG. 17 is a flowchart indicative of an outline of network data acquiring processing of the media-integrating system according to the present invention, the network data acquiring processing being practiced as one preferred embodiment thereof.

The following describes, with reference to FIG. 17, the processing of the network data acquiring block 160 to be activated when the user selects the link 803 to network or when the type 259 of the network information 250 is "embed" and data acquisition from the network 902 is instructed by the user.

Referring to FIG. 17, there is shown a flowchart outlining the network data acquiring processing of the media-integrating system according to the present invention, the network data acquiring processing being practiced as one preferred embodiment thereof.

First, in step 611, the network data acquiring block 610 shown in FIG. 3 checks whether the access key 255 exists or not. If the access key 255 is not found, the network data acquiring block 610 goes to step 613. If the access key 255 is found, then instep 612, the network data acquiring block 610 stores the access key 255 into the access key control part 351 of the access control data 350. Then, in step 613, the network data acquiring block 610 checks whether the PPV free key 256 exists or not. If the PPV free key 256 is not found, the network data acquiring block 610 goes to step 615.

If the PPV free key 256 is found, then in step 614, the network data acquiring block 610 registers the PPV free key 256 into the PPV free key control part 352 of the access control data 350. Then, in step 615, the network data acquiring block 610 checks whether the communication line with the server 152 is connected or not. If the communication line is found connected, the network data acquiring block 610 goes to step 617. If not, the network data acquiring block 610 connects the communication line with the server 152 in step 616. Next, in step 617, the network data acquiring block 610 requests the server 152 for data designated by the URL 251. At this moment, if the user ID 252 and the password 253 exist, the network data acquiring block 610 sends both the user ID 252 and the password 253 to the server 152 at the same time. Next, in step 618, the network data acquiring block 610 receives the data 300 from the server 152. After step 618, cipher processing is performed.

The network data acquiring block 610 sends the user ID 252 and the password 253 to the server 152 at the same time in order to allow reading of the data 300 only when the server 152 is accessed from a particular link even when the access is limited.

It is possible that the information designated by the URL 251 of the network information 250 is not the media-integrating data 200. For example, the information may be a program and its parameter or the parameter of a program stored in the terminal device 100. If the acquired information is a program, the acquired program is executed rather than performing the cipher processing in step 650. If the acquired information is the parameter of a program stored in the terminal device 100, the parameter is passed to that program for execution.

Figure 18:
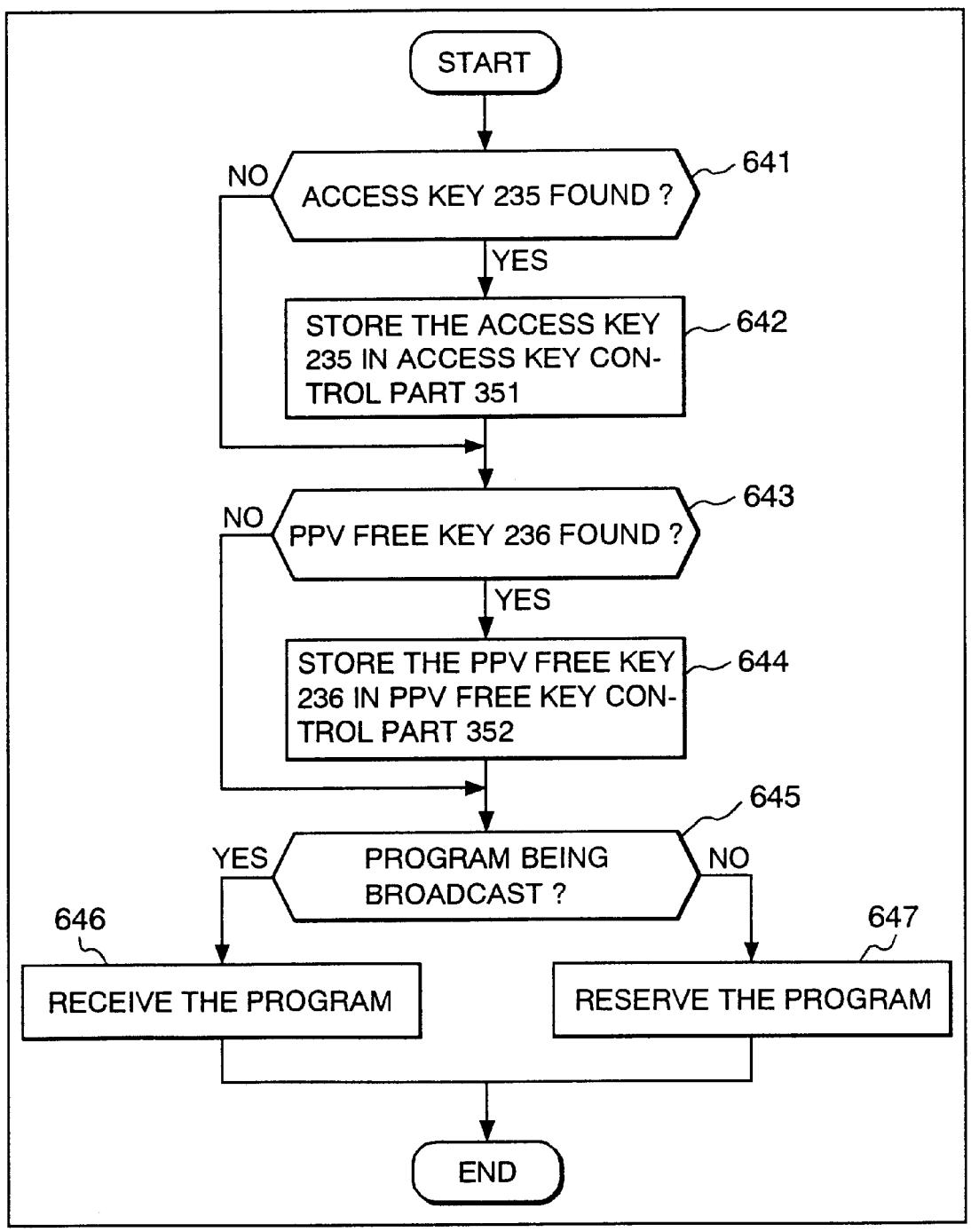
FIG. 18 is a flowchart indicative of an outline of broadcast link processing of the media-integrating system according to the present invention, the broadcast link processing being practiced as one preferred embodiment thereof.

The following describes, with reference to FIG. 18, the broadcast link processing of the broadcast link processing block 640 to be activated when the user selects the link 801 to broadcast or when the type 239 of the broadcast link information 230 is "embed" and a program coming from the relay station 903 is to be viewed.

Referring to FIG. 18, there is shown a flowchart outlining the broadcast link processing of the media-integrating system according to the present invention, the broadcast link processing being practiced as one preferred embodiment thereof.

First, in step 641, the broadcast link processing block 640 checks whether the access key 235 exists or not. If the access key 235 is not found, the broadcast link processing block 640 goes to step 643. If the access key 235 is found, the in step 642, the broadcast link processing block 640 stores the access key 235 into the access key control part 351 of the access control data 350. Then, in step 643, the broadcast link processing block 640 checks whether the PPV free key exists or not. If the PPV free key 236 is not found, the broadcast link processing block 640 goes to step 645. If the PPV free key 236 is found, the broadcast link processing block 640 stores the PPV free key 236 into the PPV free key control part 352 of the access control data 350. Next, the broadcast link processing block 640 checks in step 645 from the relationship between the date 232, the time 233, the broadcast time 234, and the current time whether a program to be linked is currently broadcast or not. If the program is found being broadcast, the broadcast link processing block 640 processes that program in step 646. The program processing is performed in the program receiving block 660 shown in FIG. 1. If the program is found not being broadcast, then in step 467, the broadcast link processing block 640 makes reservation to receive the channel specified by the channel 231 when the date 232 and the time 233 come.

Figure 19:
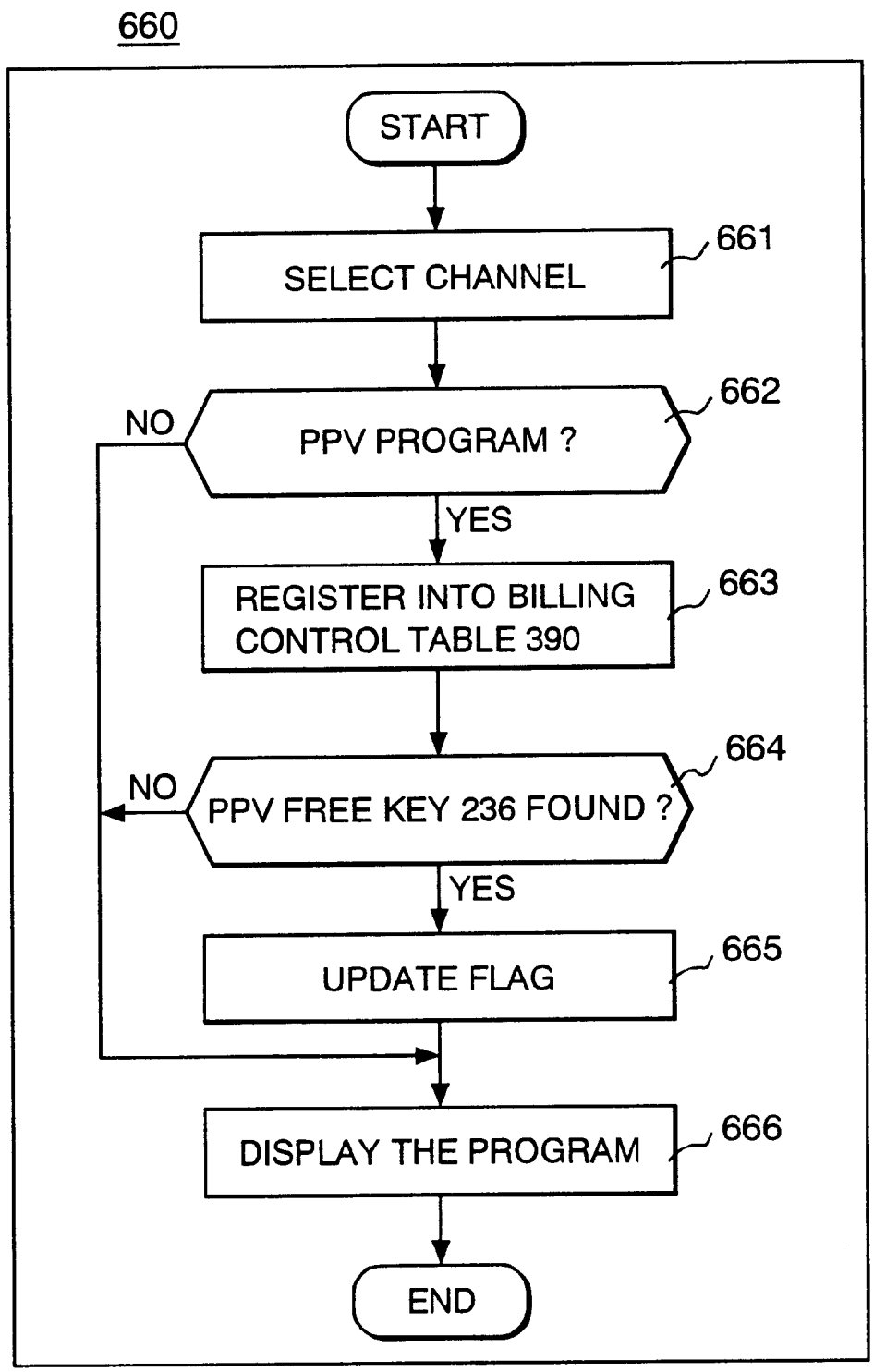
FIG. 19 is a flowchart indicative of an outline of program receiving processing of the media-integrating system according to the present invention, the program receiving processing being practiced as one preferred embodiment thereof.

The following describes the program receiving block 660 shown in FIG. 3 with reference to FIG. 19.

Referring to FIG. 19, there is shown a flowchart outlining the program receiving processing of the media-integrating system according to the present invention, the program receiving processing being practiced as one preferred embodiment thereof.

In the program receiving processing by the program receiving block 660, the broadcast receiving block 106 shown in FIG. 2 is set such that the channel specified in step 661 is received. Next, the program receiving block 660 checks in step 662 whether the received program tuned in to the channel is a PPV program or not. If the program is not a PPV program, the program receiving block 660 goes to step 666 to display the program. If the program is a PPV program, then in step 663, the program receiving block 660 sets the identifier of the program to the program ID 391 of the billing control table 390, sets the flag 392 to "0" and registers it to the billing control table 390. Then, the program receiving block 660 checks in step 664 whether the PPV free key 236 matching the program ID is registered in the PPV free key control part 352 of the access control data 350. If the PPV free key 236 is found not registered, the program receiving block 660 goes to step 666 to display thereof. If the PPV free key 236 is found registered, the program receiving block 660 updates the flag 392 of the billing control table 390 to "1" in step 665. Then, the program receiving block 660 displays the program in step 666.

PPV program billing is performed by sending billing information to the server that controls the billing of the billing control table 390. The PPV program can be made free of charge by not performing billing processing on the program for which the flag 392 is "1".

Thus, by sending the billing information along with information for indicating that the program is made free of charge to the server, the program provider can make the program free of charge while knowing that the user viewed the program.

In the above-mentioned embodiment, free of charge is identified by setting the flag. It will be apparent that, instead of setting flag in step 665, the billing control records 390a and 390b registered in step 663 may be deleted to the same effect.

As described, the terminal device 100 is capable of receiving data from three media, the package 901, the network 902, and the broadcast wave from the relay station 903. The package 901 is capable of storing large quantities of data and there suitable for storing moving pictures, still pictures, and a large amount of detail information for example. The network 902 is advantageous in that up-to-date information can be always provided by updating the data stored in the server 152. The broadcast wave transmitted from the broadcasting station 153 is characterized by that the users can be given information without actively go to get it.

Figure 21:
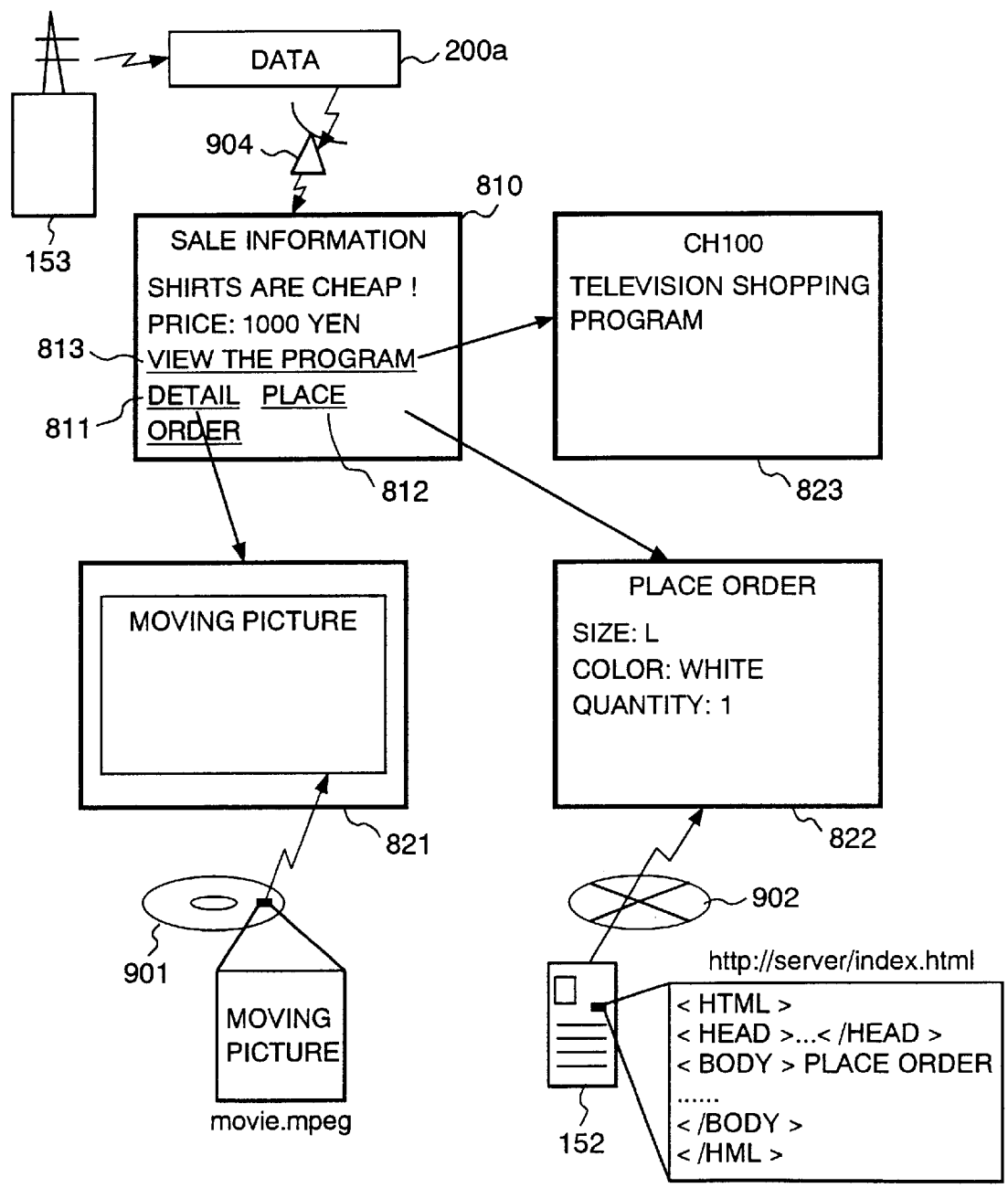
FIG. 21 is a diagram illustrating an operation of the terminal device of the media-integrating system according to the present invention, the operation being practiced as the first preferred embodiment thereof.

The following describes, with reference to FIGS. 20 and 21, an example in which product sale information is broadcast, details of the product are acquired by the package 901, and the product is ordered through the network 902. In this example, media-integrating data 200a, a first preferred embodiment of the media-integrating data 200, is transmitted from the broadcasting station 153.

FIG. 20(a) is a diagram describing, in detail, a data structure for use in the media-integrating system according to the present invention, the data structure being practiced as a first preferred embodiment.

FIG. 20(b) is a diagram illustrating a first description example showing the detail of the description of the media-integrating data for use in the media-integrating system according to the present invention.

Now, referring to FIG. 20(a), the media-integrating data 200a includes broadcast link information 230a, package information 240a, network information 250a, and other information 270a. In the broadcast link information 230a, type 239a is "link," channel 231a is "100," date 234a is "Dec. 13, 1996, " time 233a is "10:10," and broadcast time 234a is "1:00." Namely, this denotes that an associated program will be broadcast for one hour from 10 minutes past ten on Dec. 13, 1996. In the package information 240a, type 249a is "link" and file name 241a is "movie.mpeg." Namely, the details of the product (in this case, a moving picture) is stored in file "movie.mpeg" of the package 901. In the network information 250a, type 259a is "link" and URL 251a is "//server/index.html." This denotes that the information to be ordered exists in "//server/index.html." FIG. 20(b) shows an example in which the media-integrating data 200a is written in HTML. The type tag and the HREF parameter used in this figure are the same as those used in FIG. 5 and therefore can be easily understood with reference to FIG. 5.

FIG. 21 shows an example in which the media-integrating data 200a shown in FIG. 20 is processed by the terminal device 100.

Referring to FIG. 21, there is shown a diagram illustrating the operation of the media-integrating system according to the present invention, the operation being practiced as a first embodiment.

The media-integrating data received by the broadcast receiving block 106 of the terminal device 100 does not have the filter information 310, so that the media-integrating data 220a passes the filtering block 500 to be processed by the display processing block 550 of the terminal device 100 and the processed data is displayed on the screen of the display block 102 of the terminal device 100. In FIG. 21, a screen 810 shows this state. The screen 810 displays the package information 240a as the link 811 to package, the network information 250a as the link 812 to network, and the broadcast link information 230a as the link 813 to broadcast. In the screen 810, when the user specifies the link 811 to package, the data "movie.mpeg" specified by the file name 241a is acquired by the processing of the package data acquiring block 600. The acquired moving picture is displayed on the screen via the filtering block 500 and the display processing block 550. A screen 821 shows this state. If, in the screen 810, the user specifies the link 812 to network, the data "//server/index.html" designated by the URL 251a is acquired by the network data acquiring block 610. The acquired data is displayed on the screen for product ordering via the filtering block 500 and the display processing block 550. A screen 822 shows this state. Further, if the user specifies the link 813 to broadcast in the screen 810, program reservation is made such that channel number is switched to 100 if the current time is between 10:10 and 11:10 on Dec. 13, 1996, upon which that program is displayed as a screen 823; otherwise, a program of which channel number is 100 will be displayed when 10:10 on Dec. 13, 1996 comes. This allows user to view the associated program with ease.

Thus, the information is positively provided to the user from the broadcasting station or via the relay station 903. Based on the provided information, the user can also acquire detail information such as a moving picture from the package 901 and the product order information from the network 902. It should be noted that the data to be acquired from the package 901 and the network 902 may be or may not be the media-integrating data 200. Moreover, the information to be acquired from the package 901 and the network 902 may be a program which is executed by the central processing unit 101. In this case, the program that has been read may be executed, instead of being displaying by the display processing block 550.

In the above-mentioned example, the media-integrating data 200a includes three types of information; the broadcast link information 230a, the package information 240a, and the network information 250a. It should be noted that the three types of information are not always necessary. If at least one of these pieces of information is included, information retrieval from other information providing media can be made with ease.

Figure 23:
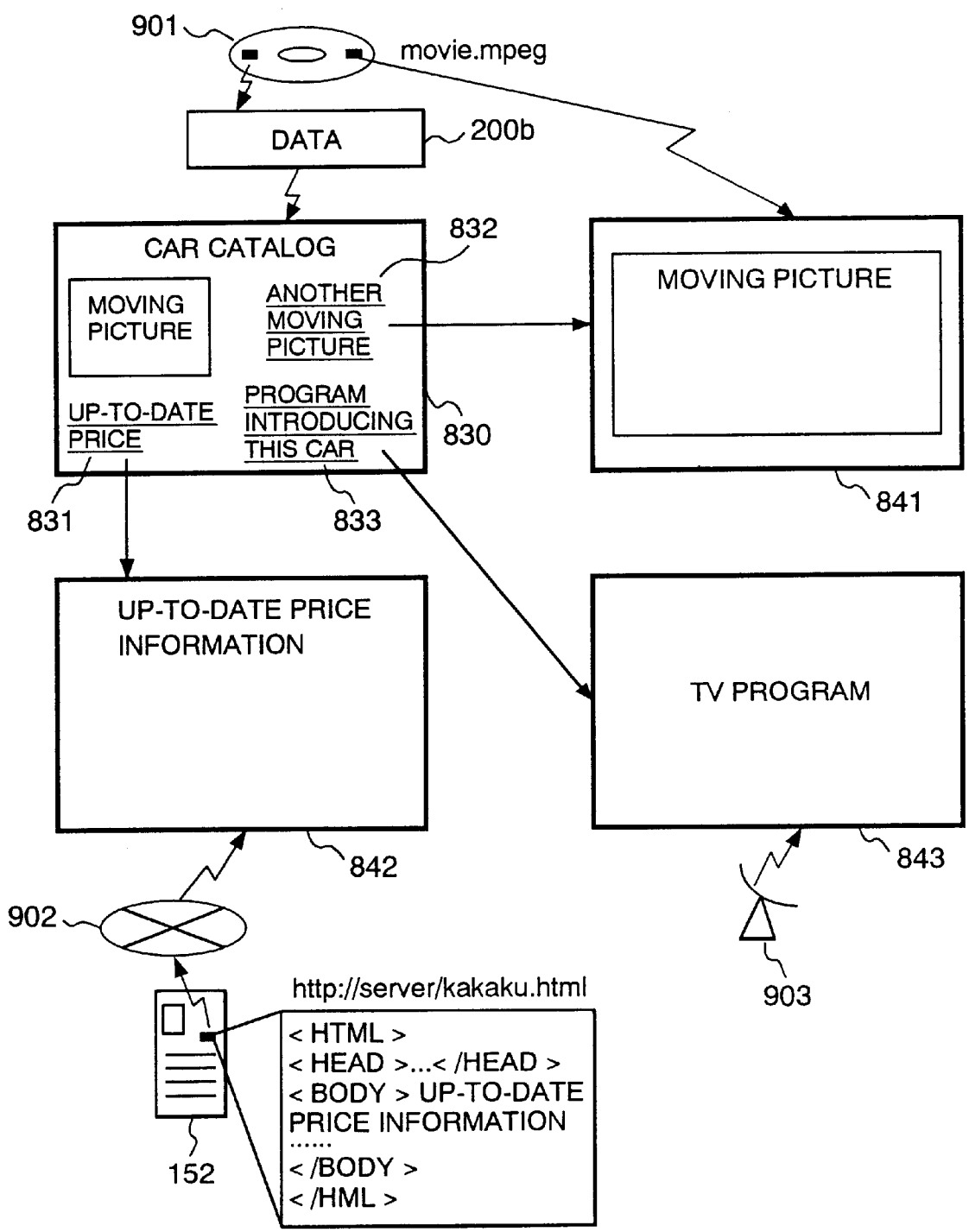
FIG. 23 is a diagram illustrating an operation of the terminal device of the media-integrating system according to the present invention, the operation being practiced as a second preferred embodiment thereof.

The following describes, with reference to FIG. 22 and 23, an example in which the user viewing the product information stored in the package 901 gets up-to-date price information from the network 902 or views a product-related program. In this example, media-integrating data 200b is stored in the package 901.

FIG. 22(a) is a diagram illustrating, in detail, a data structure for use in the media-integrating system according to the present invention, the data structure being practiced as a second preferred embodiment thereof.

FIG. 22(b) is a diagram illustrating a second description example of the data description of the media-integrating data for use in the media-integrating system according to the present invention.

As shown in FIG. 22(a), the media-integrating data 200b includes broadcast link information 230b, package information 240b, network information 250b, and other information 270b. In the broadcast link information 240b, type 239b is "link," channel 231b is "100," date 232b is "Dec. 13, 1996," time 233b is "10:10," and broadcast time 234b is "1:00." This denotes that the associated program will be broadcast for one hour from ten minutes past ten on Dec. 13, 1996. In the package information 240b, type 249b is "link" and file name 241b is "movie.mpeg." This denotes that the associated information (in this case, a moving picture) is stored in the file "movie.mpeg" of the package 901. In the network information 250b, type 259b is "link" and URL 251b is "//server/kakaku.html." This denotes that the up-to-date price information is found in "//server/kakaku.html." The other information 270b includes catalog information about cars. An example in which the media-integrating data 200b is written in HTML is also shown in FIG. 22(b). The description example shown in FIG. 22(b) can be easily understood from the description of FIG. 5.

An example in which the media-integrating data 200a shown in FIG. 22 is processed by the terminal device 100 is illustrated in FIG. 23.

Referring to FIG. 23, there is shown a diagram illustrating the operation of the terminal device of the media-integrating system according to the present invention, the operation being practiced as a second preferred embodiment thereof.

The media-integrating data 200b acquired by the package data acquiring block 600 does not have the filter information 310, so that the data passes the filtering block 500 to be processed by the display processing block of the terminal device 100. The processed data is displayed on the screen of the display block 102 of the terminal device 100. In FIG. 23, a screen 830 shows this state. The screen 830 shows the package information 240b as a link 832 to package, the network information 250b as a link 831 to network, and the broadcast link information 230b as a link 833 to broadcast. In the screen 830, when the user specifies the link 832 to package, data "movie.mpeg" specified by the file name 241b is acquired by the package data acquiring block 600. The acquired moving picture is displayed on the screen as a screen 841 via the filtering block 500 and the display processing block 550. In the screen 830, when the user specifies the link 831 to network, data "//server/kakaku.html" designated by the URL 251b is acquired by the network data acquiring block 610. The up-to-date price information is displayed on the screen as a screen 842 via the filtering block 500 and the display processing block 550. Further, in the screen 830, when the user specifies the link 833 to broadcast, the channel number is switched to 100 if the current time is between 10:10 and 11:10 on Dec. 13, 1996, and that program is displayed as a screen 843; otherwise, reservation is made such that the program of which channel number is 100 will be displayed when 10:10 comes on Dec. 13, 1996. This allows the user to view the associated program with ease.

Thus, the user can easily acquire the up-to-date information from the network 902 and view the associated program. It should be noted that the data to be acquired from the package 901 and the network 902 may be or may not be the media-integrating data 200. Further, the information to be acquired from the package 901 and the network 902 may be a program. In this case, the program that has been read may be executed instead of being displaying by the display processing block 550.

Figure 24:
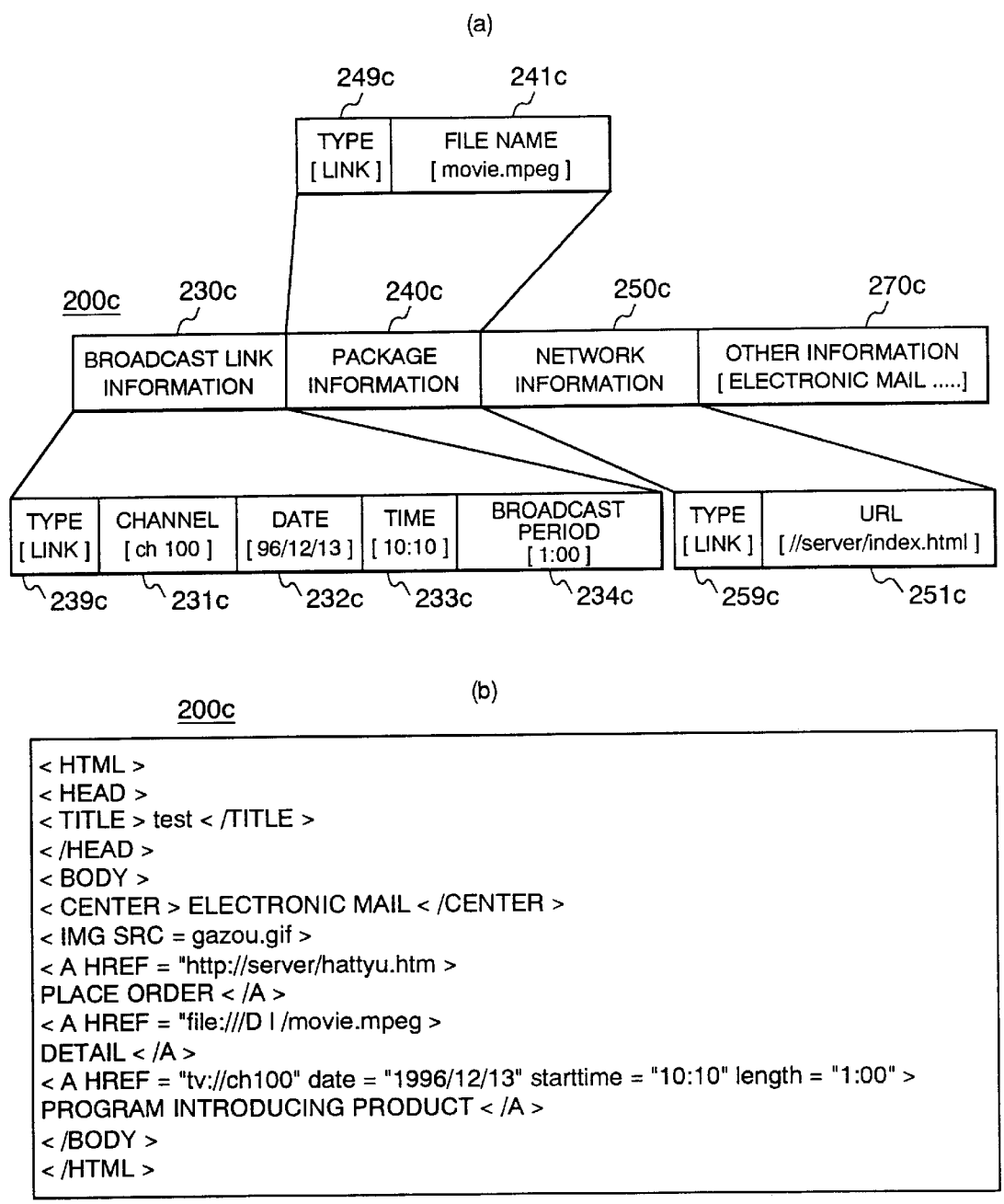
FIG. 24(a) is a diagram illustrating, in detail, a data structure for use in the media-integrating system according to the present invention, the data structure being practiced as a third preferred embodiment thereof.
FIG. 24(b) is a diagram illustrating, in detail, a third description example of a media-integrating data description for use in the media-integrating system according to the present invention.

In the above-mentioned example, the media-integrating data 200b includes three types of information; the broadcast link information 230b, the package information 240b, and the network information 250b. It should be noted that the three types of information are not always necessary. If at least one of these pieces of information is included, information retrieval from other information providing media can be made with ease. The following describes, with reference to FIGS. 24 and 25, an example in which the user accessing an electronic mall via the network 902 acquires product information from the package 901 or views the associated program.

FIG. 24(a) is a diagram illustrating, in detail, a data structure for use in the media-integrating system according to the present invention, the data structure being practiced as a third preferred embodiment thereof.

FIG. 24(b) is a diagram illustrating a third description example of the data description of the media-integrating data for use in the media-integrating system according to the present invention.

In the example of FIG. 24(a), the media-integrating data 220c is stored in the server 152 on the network 902.

The media-integrating data 200c includes broadcast link information 230c, package information 240c, network information 250c, and other information 270c. In the broadcast link information 240c, type 239c is "link," channel 231c is "100," date 232c is "Dec. 13, 1996," time 233c is "10:10," and broadcast time 234c is "1:00." This denotes that the associated program will be broadcast for one hour from ten minutes past ten on Dec. 13, 1996. In the package information 240c, type 249c is "link" and file name 241c is "movie.mpeg." This denotes that the associated product information (in this case, a moving picture) is stored in the file "movie.mpeg" of the package 901. In the network information 250c, type 259c is "link" and URL 251c is "//server/index.html." This denotes that the associated information is found in "//server/index.html." An example in which the media-integrating data 200c is written in HTML is also shown in FIG. 24(b). This description example can be easily understood from the description of FIG. 5.

Figure 25:
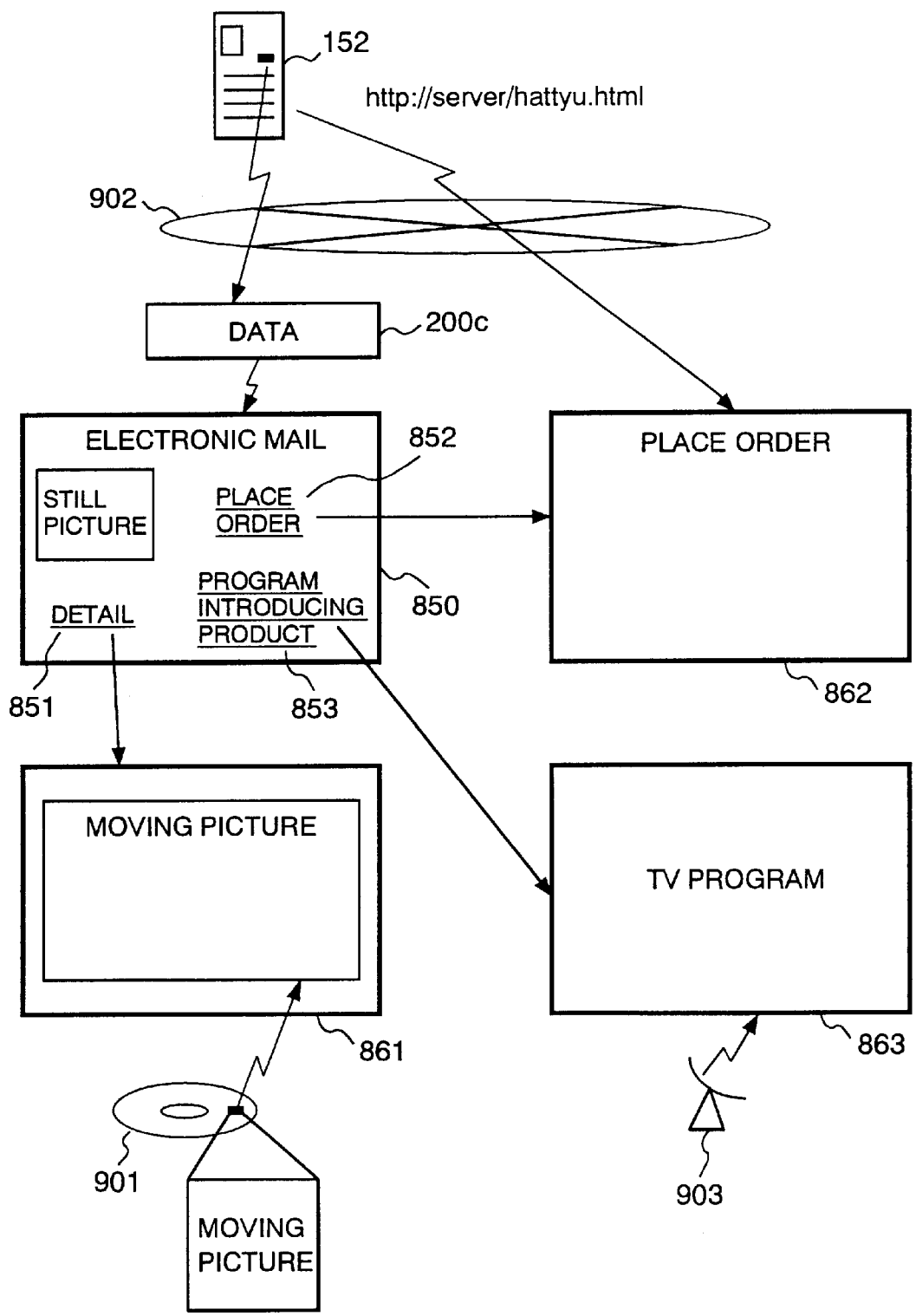
FIG. 25 is a diagram illustrating an operation of the terminal device of the media-integrating system according to the present invention, the operation being practiced as a third preferred embodiment thereof.

Referring to FIG. 25, there is shown a diagram illustrating the operation of the terminal device of the media-integrating system according to the present invention, the operation being practiced as a third preferred embodiment thereof.

The media-integrating data 200c acquired by the network data acquiring block 610 does not have the filter information 310, so that the data passes the filtering block 500 to be processed by the display processing block of the terminal device 100. The processed data is displayed on the screen of the display block 102 of the terminal device 100. In FIG. 25, this screen is shown as a screen 850. The screen 850 shows the package information 240c as a link 851 to package, the network information 250c as a link 852 to network, and the broadcast link information 230c as a link 853 to broadcast. In the screen 850, when the user specifies the link 851 to package, data "movie.mpeg" specified by the file name 241c is acquired by the package data acquiring block 600. The detail information acquired from the package 901 is displayed on the screen via the display processing block 550 as a moving picture for example. In the screen 850, when the user specifies the link 852 to network, data "//server/index.html" designated by the URL 251c is acquired by the network data acquiring block 610. The associated information is displayed on the screen as a screen 862 via the filtering block 500 and the display processing block 550. Further, in the screen 850, when the user specifies the link 853 to broadcast, the channel number is switched to 100 if the current time is between 10:10 and 11:10 on Dec. 13, 1996, and that program is displayed as a screen 863; otherwise, reservation is made such that the program of which channel number is 100 will be displayed when 10:10 comes on Dec. 13, 1996. This allows the user to view the associated program with ease.

Thus, the user can easily acquire the detail product information from the package 901 and view the associated program even while accessing the network 902. It should be noted that the data to be acquired from the package 901 and the network 902 may be or may not be the media-integrating data 200. Further, the information to be acquired from the package 901 and the network 902 may be a program. In this case, the program that has been read may be executed instead of being displaying by the display processing block 550.

In the above-mentioned example, the media-integrating data 200c includes three types of information; the broadcast link information 230c, the package information 240c, and the network information 250c. It should be noted that the three types of information are not always necessary. If at least one of these pieces of information is included, information retrieval from other information providing media can be made with ease.

Moreover, the present invention can provide information that makes the most of the features of the media by not only embedding links in other media but also simultaneously displaying data acquired from two or more media. This example will be described with reference to FIGS. 26 and 27.

Referring to FIG. 26(a), there is shown a diagram illustrating in detail a data structure for use in the media-integrating system according to the present invention, the data structure being practiced as a fourth preferred embodiment thereof.

Referring to FIG. 26(b), there is shown a diagram illustrating a fourth description example of the media-integrating data use in the media-integrating system according to the present invention.

Figure 26:
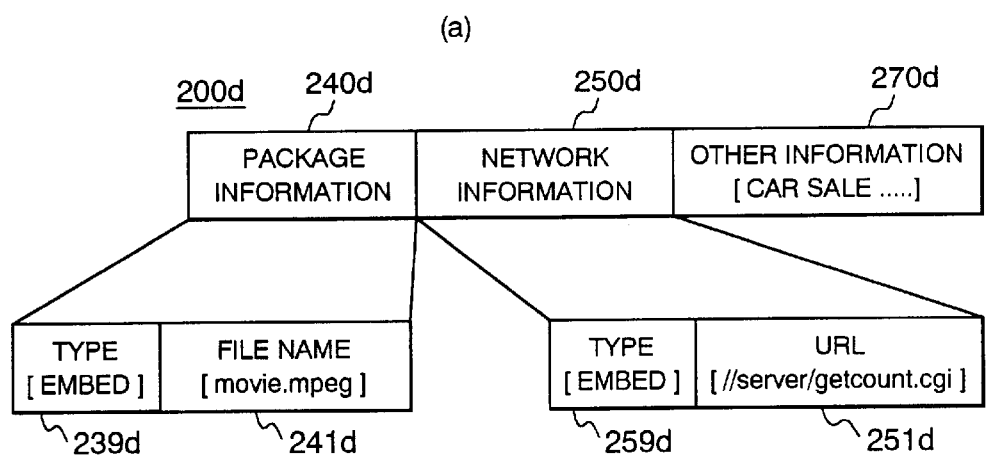
FIG. 26(a) is a diagram illustrating, in detail, a data structure for use in the media-integrating system according to the present invention, the data structure being practiced as a fourth preferred embodiment thereof.
FIG. 26(b) is a diagram illustrating, in detail, a fourth description example of a media-integrating data description for use in the media-integrating system according to the present invention.

In the example of FIG. 26, product sale information is transmitted from the broadcasting station 153 or via the relay station 903. The terminal device 100 is adapted to simultaneously display the broadcast wave, the moving picture acquired from the package 901, and the up-to-date information (in this case, stock information) acquired from the network 902.

First, media-integrating data 200d to be transmitted by broadcasting will be described.

The media-integrating data 200d includes package information 240d, network information 250d, and other information 270d. In the package information 240d, type 249d is "embed" and file name 241d is "movie.mpeg." This denotes that the product moving picture is stored in file "movie.mpeg" of the package 901. In the network information 250d, type 259d is "embed" and URL 251d is "//server/getcount.cgi." This denotes that stock information is in "//server/getcount.cgi." An example in which the media-integrating data 200d is written in HTML is also shown in FIG. 26(b). This description example can be easily understood from the description made above.

Figure 27:
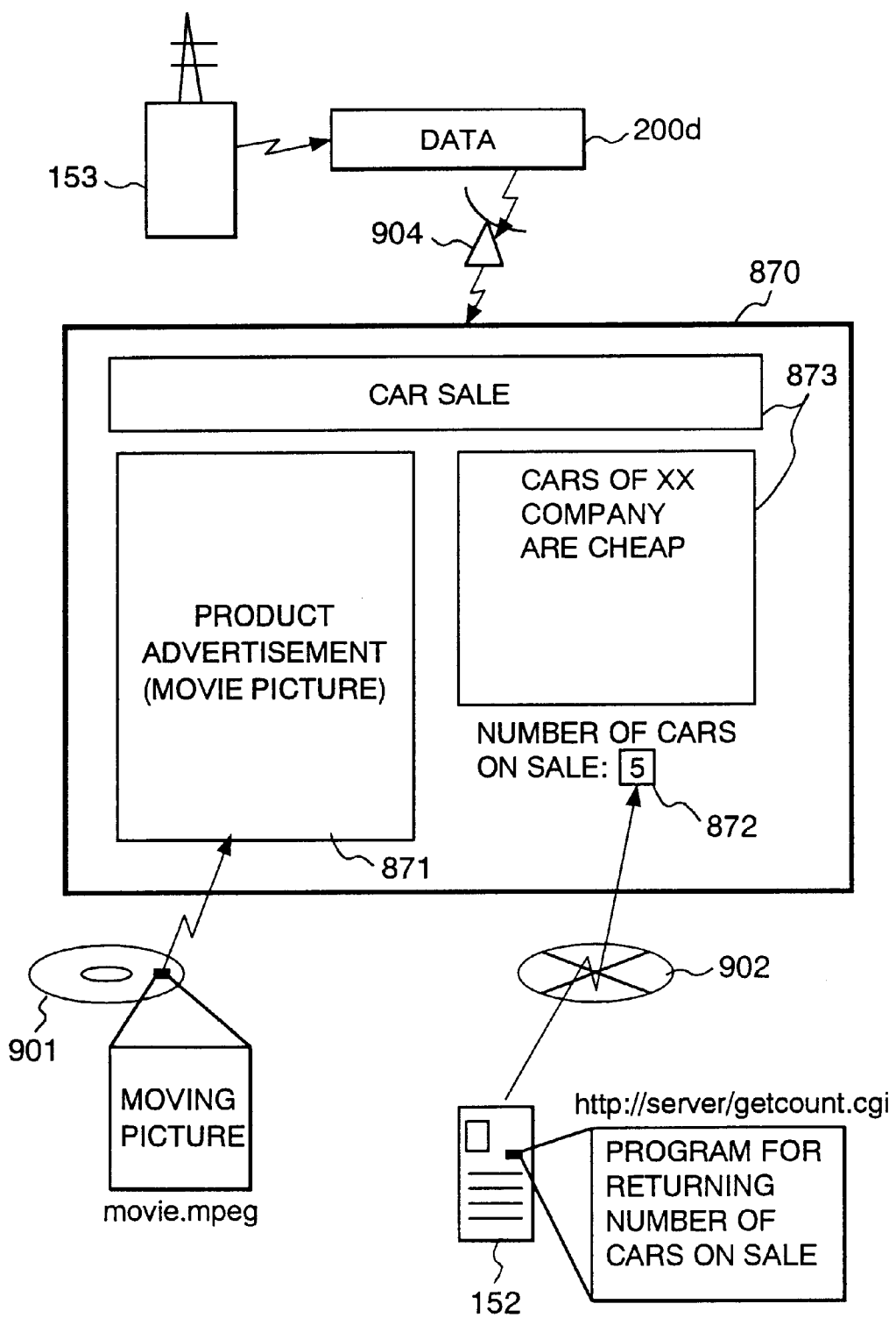
FIG. 27 is a diagram illustrating an operation of the terminal device of the media-integrating system according to the present invention, the operation being practiced as a fourth preferred embodiment thereof.

Referring to FIG. 27, there is shown a diagram illustrating the operation of the terminal device of the media-integrating system according to the present invention, the operation being practiced as a fourth preferred embodiment thereof.

The media-integrating data 200d received by the broadcast receiving block 106 of the terminal device 100 shown in FIG. 2 does not have the filter information 310, so that the media-integrating data 200d passes the filtering block 500 to be processed by the display processing block 550 of the terminal device 100. The processed data is displayed on the screen of the display block 201. This screen is regarded as a screen 870. The screen 870 displays information 873 acquired by broadcasting. The information 873 is included in the other information 270d. Because the type 249d of the package information 240d included in the media-integrating data 200d is "embed," data "movie.mpeg" specified by the file name 241d is acquired by the package data acquiring block 600. The acquired data is displayed in a part of the screen 870 as information 871 via the filtering block 500 and the display processing block 550. Further, because the type 259d of the network information 250d is also "embed," data "//server/getcount.cgi" specified by the URL 251d is acquired by the network data acquiring block 610. The acquired up-to-date stock information is displayed in a part of the screen 870 as information 872 via the filtering block 500 and the display processing block 550.

Thus, sending the information about outline of sale from the broadcasting station 153 or the relay station 903 allows the user to get the sale information without making the user specially go for the information. The information acquired from broadcast information includes moving pictures which it is not realistic to send by broadcasting or network. Information provision appealing to the user is made practical by reading and displaying these moving pictures from the package 901 and or reading and displaying from the network 902 such information requiring promptness as "the number of cars remaining for sale" for example.

The information acquired from the package 901 or the network 902 may be a program and its data or data for use by a program stored in the terminal device 100. In this case, as described earlier, the acquired program or the program stored in the terminal device 100 can be executed. Therefore, if the file name 241d of the package information 240d of the above-mentioned example is a parameter of a program for changing colors stored in the terminal device 100 for example, the color of the display of the information sent from the broadcasting station 153 or the relay station 903 can be changed. Moreover, if the file name 241d of the package information 240d of the above-mentioned example is a parameter of a program for displaying television telop stored in the terminal device 100 for example, the parameter can be read from the package 901 and the read parameter can be displayed as television telop on the screen of the terminal device 100. Thus, depending on the package 901 possessed by the user, screen display colors and television telop display can be varied in the present invention.

In the above-mentioned example, the media-integrating data 200d contains three types of information; the broadcast link information 230d, the package information 240d, and the network information 250d. But, these three types of information are not always necessary. If any one of these pieces of information is contained, the information acquired from the other information providing media can be displayed, thereby allowing information provision appealing to the user.

Figure 28:
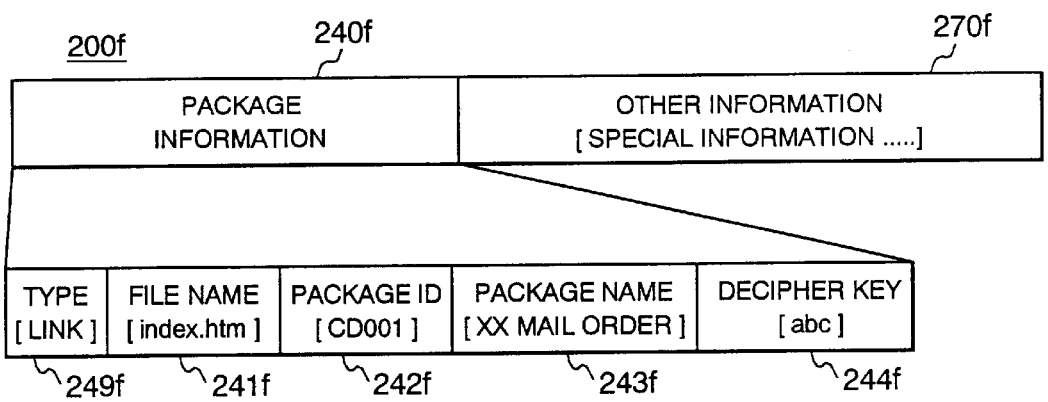
FIG. 28(a) is a diagram illustrating, in detail, a data structure for use in the media-integrating system according to the present invention, the data structure being practiced as a fifth preferred embodiment thereof.
FIG. 28(b) is a diagram illustrating, in detail, a fifth description example of a media-integrating data description for use in the media-integrating system according to the present invention.
Figure 29:
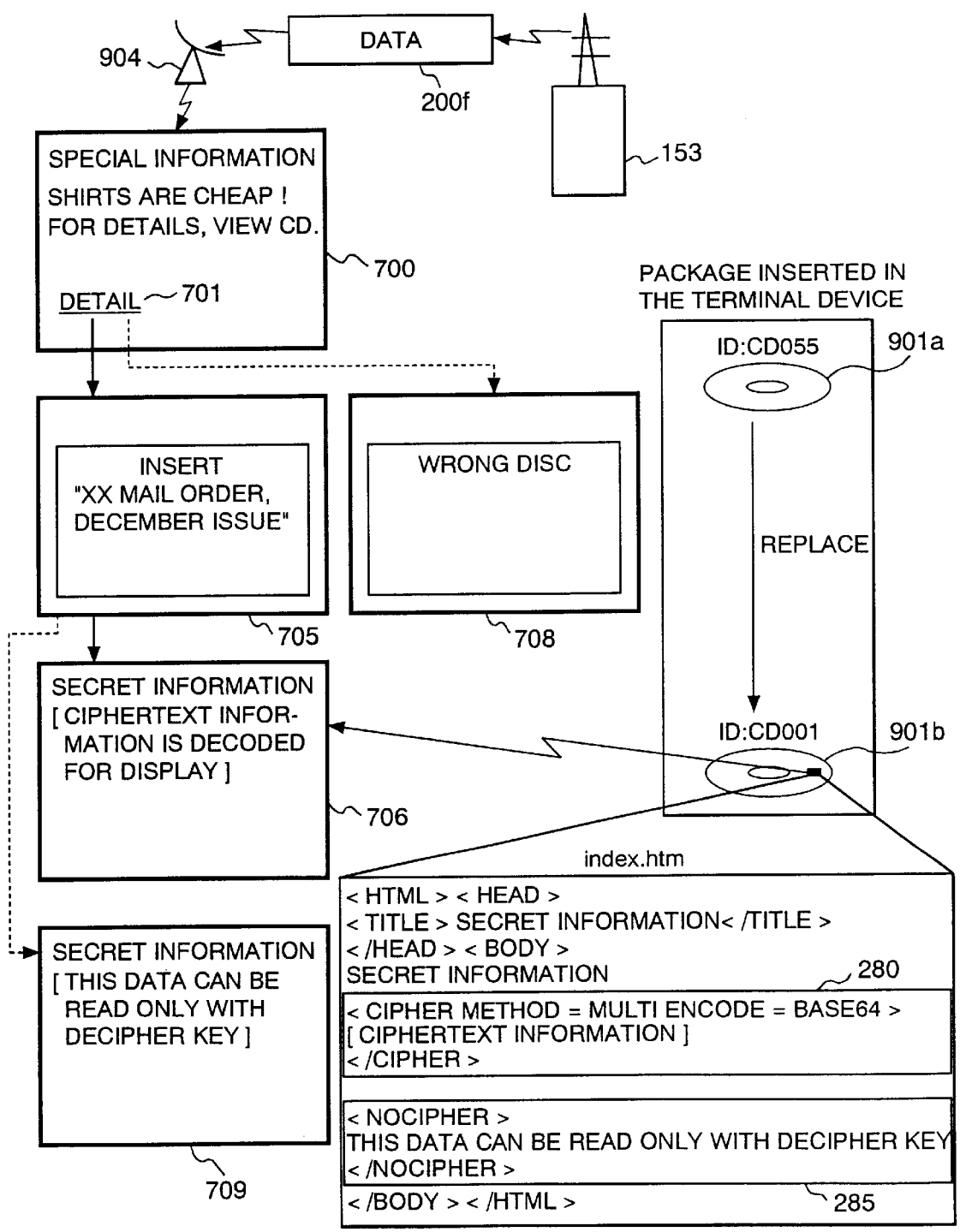
FIG. 29 is a diagram illustrating an operation of the terminal device of the media-integrating system according to the present invention, the operation being practiced as a fifth preferred embodiment thereof.

The following describes, with reference to FIGS. 28 and 29, the effects of the package ID 242, the package name 243, and the decipher key 244 included in the package information 240.

Referring to FIG. 28(a), there is shown a diagram illustrating in detail a data structure for use in the media-integrating system according to the present invention, the data structure being practiced as a fifth preferred embodiment thereof.

Referring to FIG. 28(b), there is shown a diagram illustrating in detail a fifth description example of data description for use in the media-integrating system according to the present invention.

First, a constitution of media-integrating data 200f including a package ID 242f, a package name 243f, and a decipher key 244f. The media-integrating data 200f includes package information 240f and other information 270f. In the package information 240f, type 249f is "link," file name 241f is "index.htm," package ID 242f is "CD001," package name 243f is "Mail order, December issue," and decipher key 244f is "abc." An example in which the media-integrating data 200f is written in HTML is shown in FIG. 28(b).

Referring to FIG. 29, there is shown a diagram illustrating the operation of the terminal device of the media-integrating system according to the present invention, the operation being practiced as a fifth preferred embodiment thereof.

The media-integrating data 200f received by the broadcast receiving block 106 of the terminal device 100 does not have the filter information 310. Therefore, the data passes the filtering block 500 to be captured in the display processing block 550. The data is processed by the display processing block 550 to be displayed on the screen of the display block 102. In FIG. 29, this screen is shown as a screen 700. The screen 700 displays the package information 240f as a link 701 to package. In the screen 700, when the user specifies the link 701 to package, the package data acquiring block 600 checks the identifier of the package in which the package ID 242f is inserted. If a package 901a having identifier "CD055" for example is inserted in the terminal device 100, a screen 705 displays the name of the correct package and a message for prompting the user to insert the same. At this moment, displaying the package name 243f included in the package information 240f lets the user know the correct package 901a. Also, as shown in the screen 708, a message that the package 901 is a wrong package may be displayed for the user. This display is effective when the package name 243f does not exist. When the user inserts a package 901b of which identifier is "CD001," data "index.htm" specified by the file name 241f is read from the package 901b. If the data to be read "index.htm" has the ciphertext data block 280 and the plaintext data block 285 for example. In this case, since the read data contains the ciphertext data block 280, the data in the ciphertext data block 280 is decoded by use of the decipher key 244f through the cipher processing by the cipher processing block 650. The decoded data is displayed as shown in the screen 706 via the filtering block 500 and the display processing block 550. In this example, the decipher key 244f exists; if the decipher key 244f does not exist, however, the content of the plaintext data block 285 is displayed on the screen by the cipher processing of the cipher processing block 650.

Thus, whether the correct package 901 is inserted or not can be determined by the package ID 242f, thereby reading data from the correct package 901. If the inserted package 901 is determined a wrong package, the package name 243f notifies the user of the correct package 901. Further, only when information is read from the particular package information 240f, the ciphertext data can be decoded by the decipher key 244f to be displayed.

If information associated with the valid date of the package 901 is stored, the valid date can be checked before information is read from the package 901 and, if the valid date is found expired, a message telling thereof can be issued.

It should be noted that the decipher key 254 included in the network information 250 has the same effect as the decipher key 244f included in the package information. The effect of the package ID 242f is different from the effect of the decipher key 244f, which are also valid separately. Further, in the above-mentioned example, the package information 240f including the package ID 242f, the package name 243f, and the decipher key 244f is sent by broadcasting. It will be apparent that the similar data can also be provided by the server 152.

Figure 30:
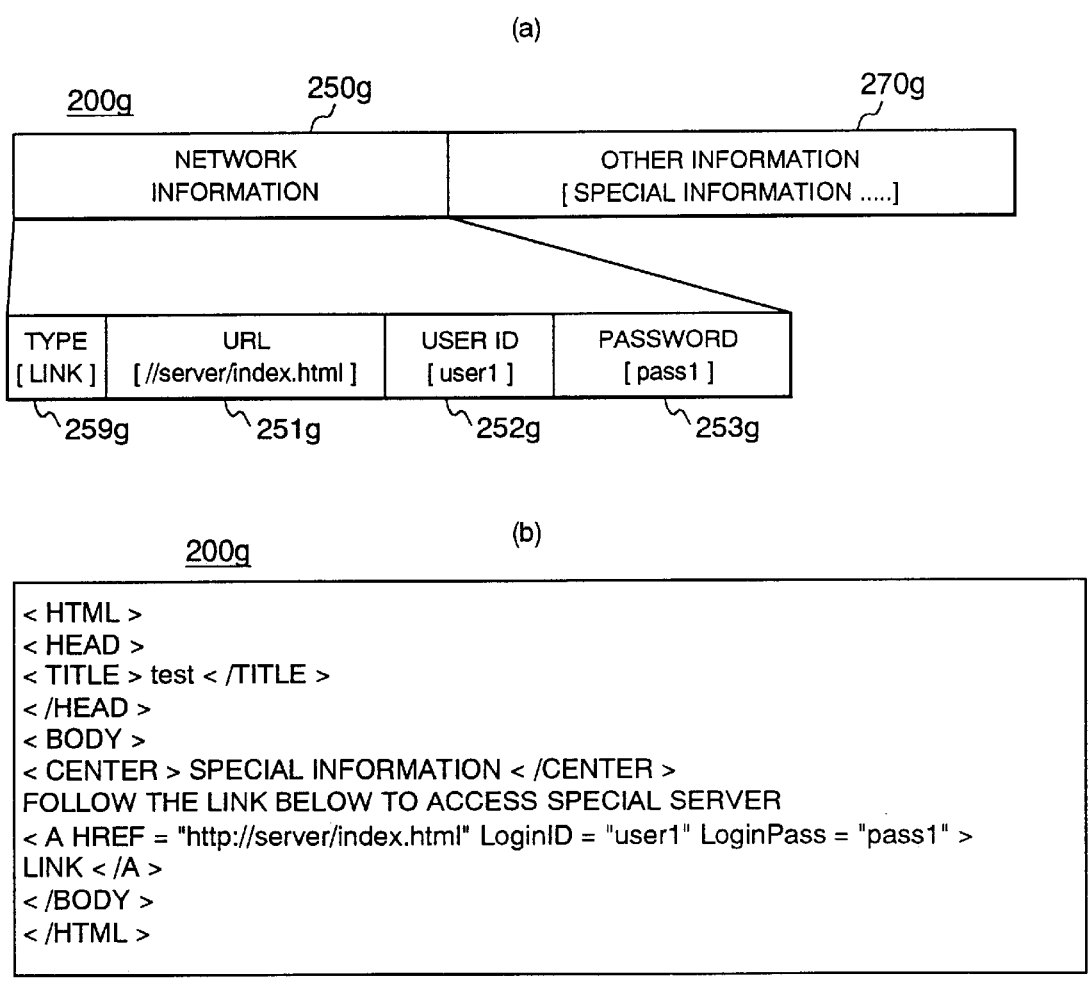
FIG. 30(a) is a diagram illustrating, in detail, a data structure for use in the media-integrating system according to the present invention, the data structure being practiced as a sixth preferred embodiment thereof.
FIG. 30(b) is a diagram illustrating, in detail, a sixth description example of a media-integrating data description for use in the media-integrating system according to the present invention.
Figure 31:
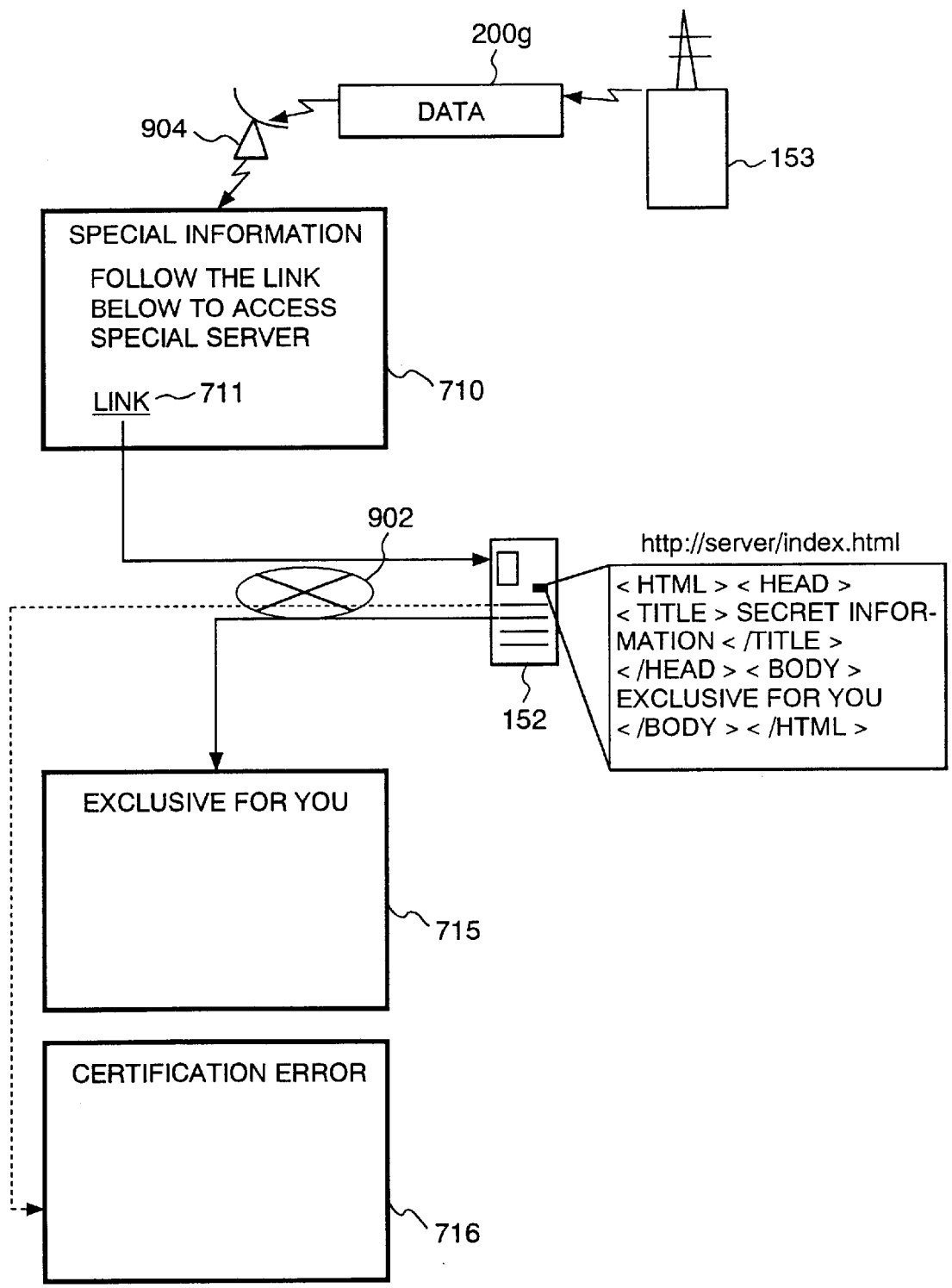
FIG. 31 is a diagram illustrating an operation of the terminal device of the media-integrating system according to the present invention, the operation being practiced as a sixth preferred embodiment thereof.

The following describes the effects of the user ID 252 and the password 253 included in the network information 250 with reference to FIGS. 30 and 31.

Referring to FIG. 30(a), there is shown a diagram illustrating in detail a data structure for use in the media-integrating system according to the present invention, the data structure being practiced as a sixth preferred embodiment thereof.

Referring to FIG. 30(b), there is shown a diagram illustrating in detail a sixth description example of the media-integrating data description for use in the media-integrating system according to the present invention.

First, a constitution of media-integrating data 200g including a user ID 252g and a password 253g with reference to FIG. 30(a). The media-integrating data 200g includes network information 250g and other information 270g. In the network information 250g, type 259g is "link," URL 251g is "//server/index.htm," the user ID 252g is "user1," and the password 253g is "pass1." An example in which the media-integrating data 200g is written in HTML is shown in FIG. 30(b). The description of FIG. 30(b) can be easily understood from the foregoing description and therefore is skipped.

Referring to FIG. 31, there is shown a diagram illustrating the operation of the terminal device of the media-integrating system according to the present invention, the operation being practiced as a sixth preferred embodiment thereof.

The media-integrating data 200g received by the broadcast receiving block 106 does not have the filter information 310 and therefore passes the filtering block 500 to be processed by the display processing block 550 of the terminal device 100. The processed data is displayed on the screen of the display block 102. In FIG. 31, this screen is shown as a screen 710. The screen 710 displays the network information 250g as a link 711 to network. In the screen 710, when the user specifies the link 711 to network, the network data acquiring block 610 requests the server 152 for data "//server/index.htm" designated by the URL 251g because the user ID 252g exists and, at the same time, sends the user ID 252g and the password 253g. If the user ID 252g and the password 253g are correct, "//server/index.htm" is returned from the server 152 to be displayed on the screen 715 as shown. If the user ID 252g or the password 253g is wrong or not included in the network information 250g, an error is returned from the server 152 to be displayed on the screen 716 as shown.

Thus, the user ID 252g and the password 253g allow access to particular information of the server 152 only from particular network information 250g.

In the above-mentioned example, the network information 250g including the broadcast wave from the relay station 903, the user ID 252g, and the password 253g is transmitted. It will be apparent that the similar data may be provided in the package 901 or by the server 152.

Figure 32:
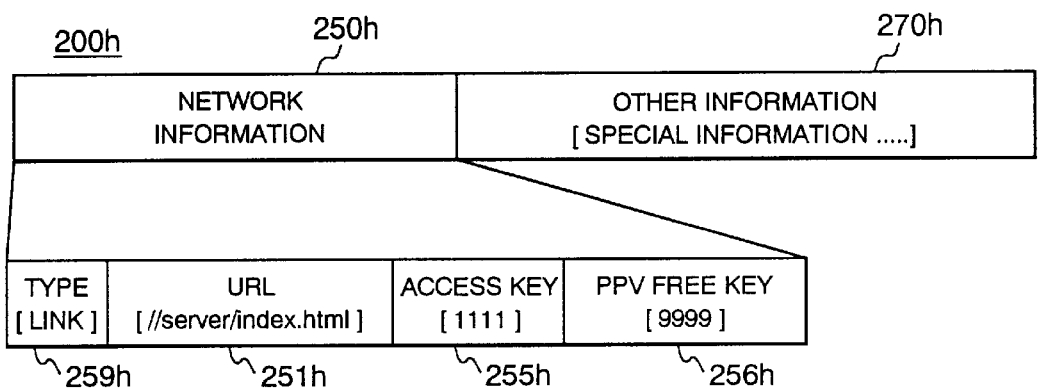
FIG. 32(a) is a diagram illustrating, in detail, a data structure for use in the media-integrating system according to the present invention, the data structure being practiced as a seventh preferred embodiment thereof.
FIG. 32(b) is a diagram illustrating, in detail, a seventh description example of a media-integrating data description for use in the media-integrating system according to the present invention.
Figure 33:
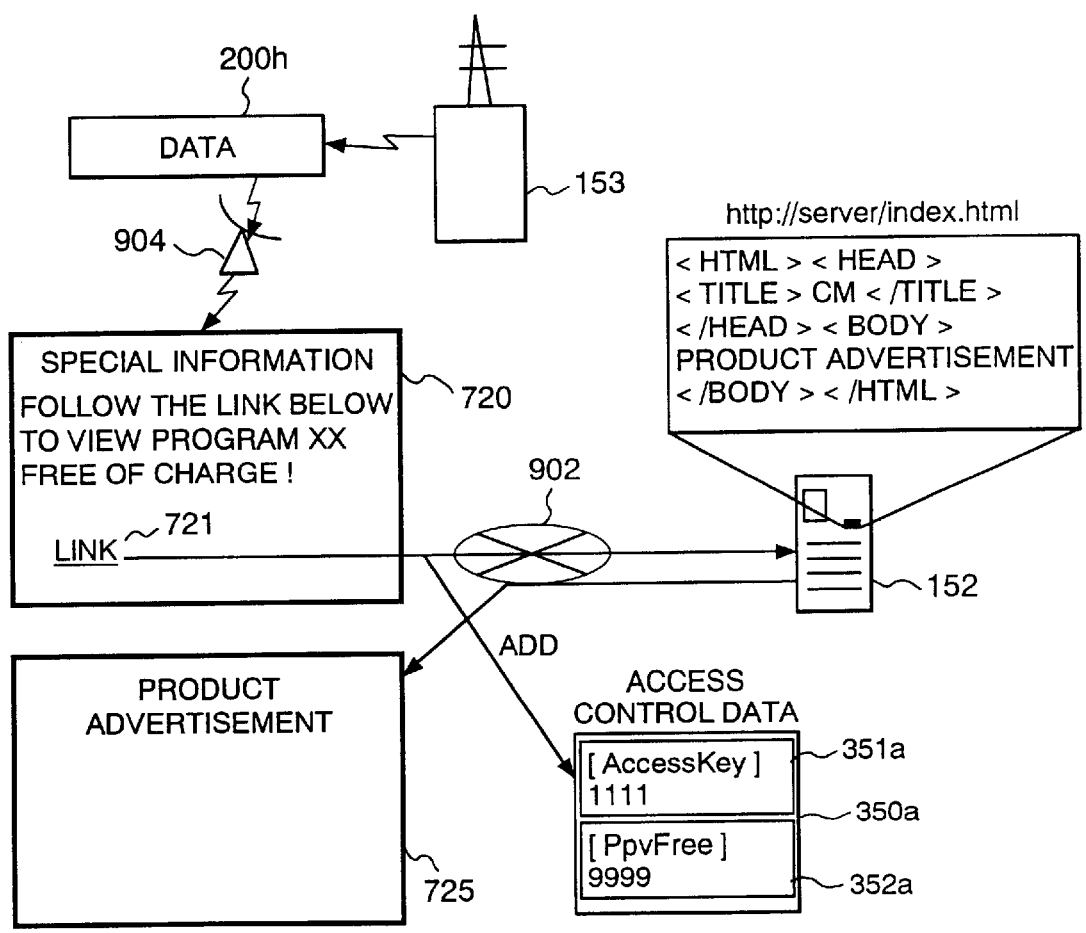
FIG. 33 is a diagram illustrating an operation of the terminal device of the media-integrating system according to the present invention, the operation being practiced as a seventh preferred embodiment thereof.
Figure 34:
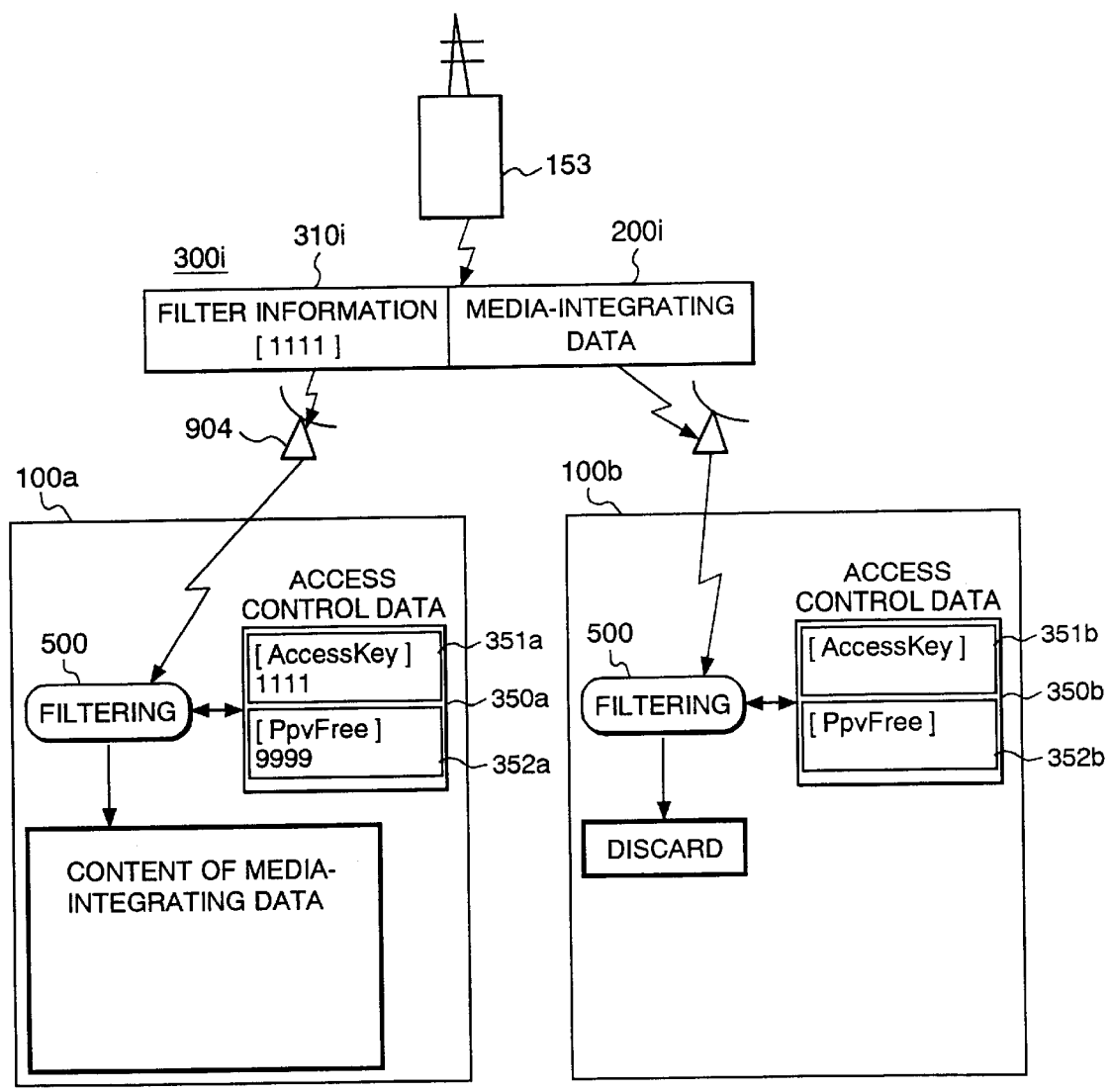
FIG. 34 is a diagram illustrating an operation of the terminal device of the media-integrating system according to the present invention, the operation being practiced as an eighth preferred embodiment thereof.

The following describes the effects of the access key 255 and the PPV free key 256 included in the network information 250 with reference to FIGS. 32, 33, and 34.

Referring to FIG. 32(a), there is shown a diagram illustrating in detail data for use in the media-integrating system according to the present invention, the data being practiced as a seventh preferred embodiment thereof.

Referring to FIG. 32(b), there is shown a diagram illustrating in detail a seventh description example of media-integrating data description for use in the media-integrating system according to the present invention.

Now, with reference to FIG. 32(a), a constitution of media-integrating data 200h including an access key 255h and a PPV free key 256h will be described. The media-integrating data 200h includes network information 250h and other information 270h. In the network information 250h, a type 259h is "link," a URL 251h is "//server/index.htm," the access key 255h is "1111," and the PPV free key 256h is "9999." An example in which the media-integrating data 200h is written in HTML is shown in FIG. 32(b).

Referring to FIG. 33, there is shown a diagram illustrating the operation terminal device of the media-integrating system according to the present invention, the operation being practiced as a seventh preferred embodiment thereof.

The media-integrating data 200h received by the broadcast receiving block 106 does not have the filter information 310 and therefore passes the filtering block 500 to be processed by the display processing block 550 of the terminal device 100. The processed data is displayed on the screen of the display block 102 as a screen 720. The screen 720 displays the network information 250h as a link 721 to network. In the screen 720, when the user specifies the link 721 to network, the network data acquiring block 610 adds the access key 255h namely [1111] to the access key control part 351a of the access control data and the PPV free key 256h namely [9999] to the PPV free key control part 352a. The acquired information is displayed on the screen via the filtering block 500 and the display processing block 550. This screen is shown as a screen 725. Then, the process develops as shown in FIG. 34.

Referring to FIG. 34, there is shown a diagram illustrating the operation of the terminal device of the media-integrating system according to the present invention, the operation being practiced as an eighth preferred embodiment thereof.

It is assumed that data 300i is received in FIG. 34. The data 300i has filter information 310i that stores [1111]. The terminal device 100a on which the media-integrating data 200h was received and the link 721 to network was followed, has the access key [1111] in the access key control part 351a, so that this data is received by the filtering block and the filtered data is displayed on the screen. However, with the terminal device 100b on which the media-integrating data 200h was received but the link 721 to network was not followed, the access key control part 351b does not have the access key [1111], so that the data 300i is discarded.

Thus, a combination of the access key 255h and the filtering block 500 allows acquisition of particular data only on the terminal device 100 that acquired particular information. Also, if particular information has been acquired, storing the PPV free key 256h can make a particular program free of charge by combination with the program receiving block 660.

It should be noted that the effect of the access key 255h is different from the effect of the PPV free key 256h, which are valid independently. The access key 235 and the PPV free key 236 included in the broadcast link information 230, the access key 245 and the PPV free key 246 included in the package information 240, and the access key 261 and the PPV free key 262 included in the access control information 260 have the same effects as those of the access key 245 and the PPV free key 246 included in the package information 240.

Figure 35:
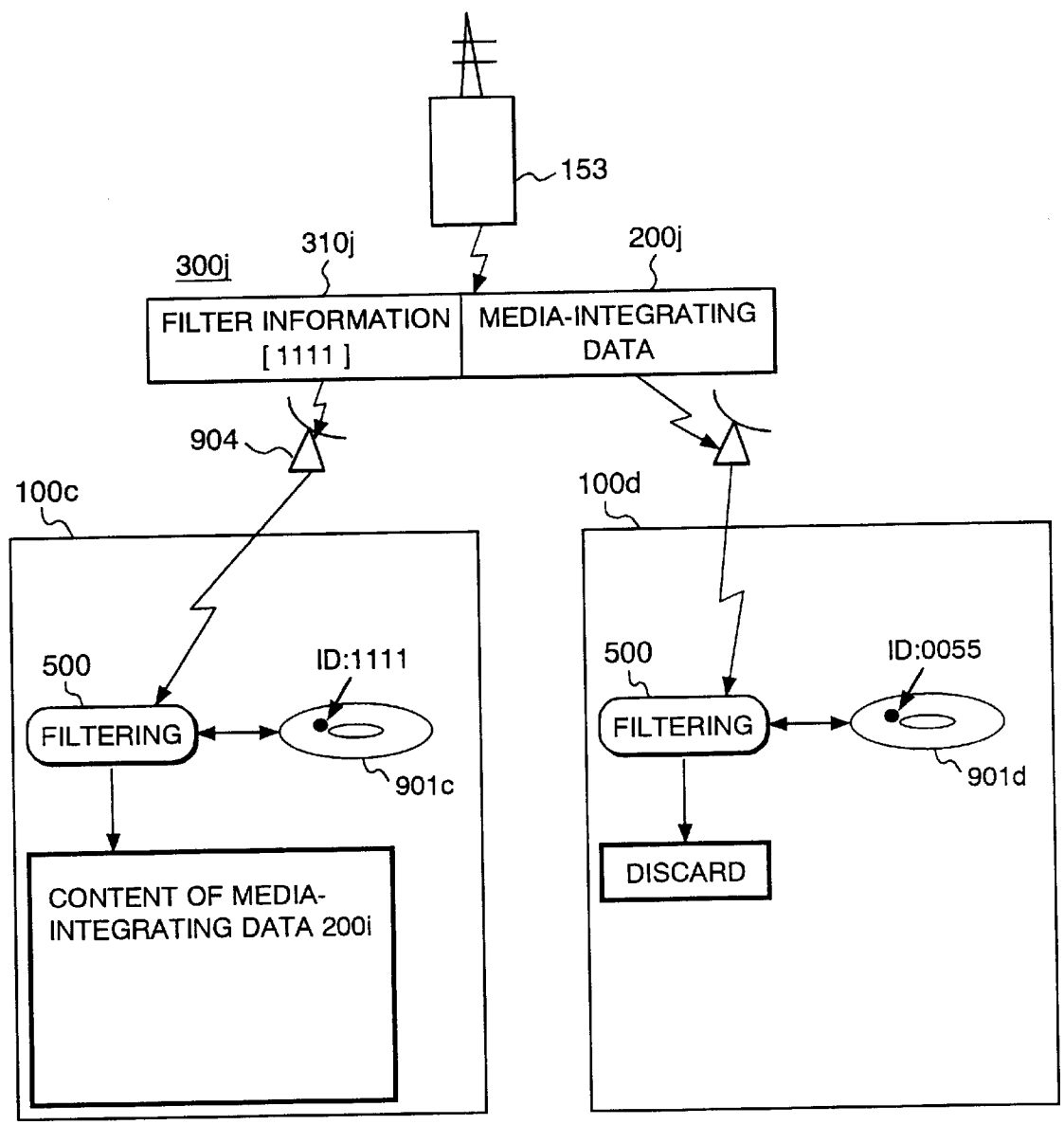
FIG. 35 is a diagram illustrating an operation of the terminal device of the media-integrating system according to the present invention, the operation being practiced as a ninth preferred embodiment thereof.

The following describes an example in which data 300 is selectively received by use of the information contained in the package 901 with reference to FIG. 35.

Referring to FIG. 35, there is shown a diagram illustrating the operation of the terminal device of the media-integrating system according to the present invention, the operation being practiced as a ninth preferred embodiment thereof.

In the embodiment shown in FIG. 35, the processing of step 501 of the filtering block 500 may be skipped (refer to FIG. 12). Further, in step 503, the identifier of the package 901 may be regarded as the access key without using the access control data 350 to perform the check for a match with the filter information 310.

Now, it is assumed that media-integrating data 300j has been received at the terminal device 100c and the terminal device 100d. It should be noted that [1111] is set to the media-integrating data 100j as the filter information 310j. The package 901c is inserted in the terminal device 100c and the package 901d in the terminal device 100d. It should also be noted that the package 901c has [1111] as the identifier and the package 901d has [0055] as the identifier.

In the above-mentioned constitution, at the terminal device 100c, the identifier read from the package 901c matches the content of the filter information 310j, so that the media-integrating data 200j can be acquired by the filtering block 500 to be displayed. On the other hand, at the terminal device 100d, the identifier read from the package 901d does not match the content of the filter information 310, so that the media-integrating data 200j is discarded by the filtering block 500.

Thus, simply inserting the package 901 into the terminal device 100 allows reception of only particular data 300.

Another method is also available in which the data 300 is selectively received by the package 901. To do so, the same data as the access control data 350 may be stored in the package 901 and, when the user inserts the package 901 into the terminal device 100, the data may be read from the package 901 to be added to the access control data 350. Then, when the user ejects the package 901 from the terminal device 100, the access key and the PPV free key added at the insertion may be deleted. Thus, the particular data 300 can pass the filtering block 500 only while the package 901 is in the inserted state. This constitution also makes a particular pay program free of charge while the package 901 is in the inserted state.

According to one preferred embodiment of the present invention, a temporary storage device for storing received broadcast wave may be connected to the terminal device 100 to record broadcast and reproduce the same after broadcasting, thereby realizing the same services as those provided in broadcasting. This example will be described with reference to FIG. 36.

Figure 36:
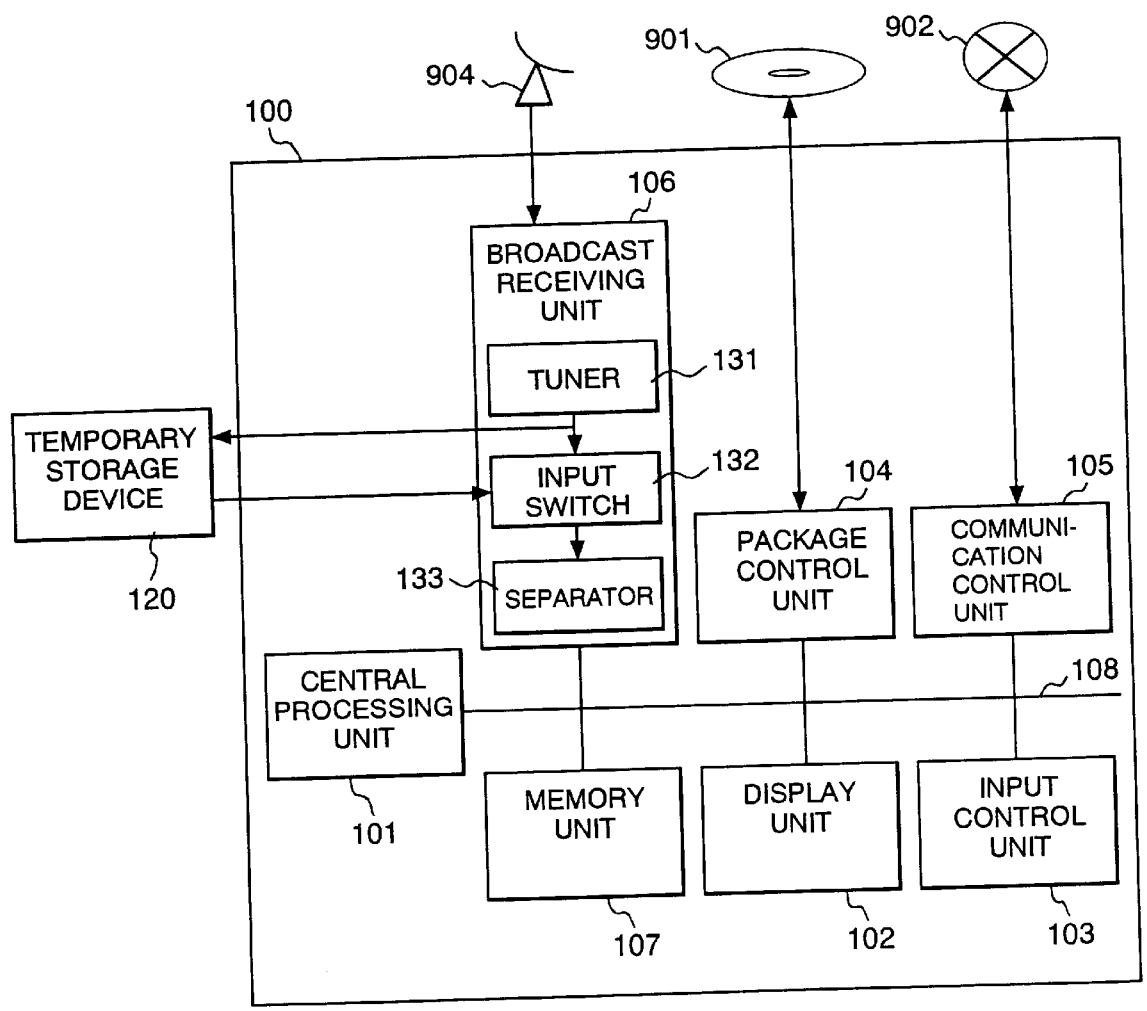
FIG. 36 is a block diagram illustrating the terminal device having a temporary storage device of the media-integrating system according to the present invention, the terminal device being practiced as a tenth preferred embodiment thereof.

Referring to FIG. 36, there is shown a block diagram illustrating the operation of the terminal device having a temporary storage device of the media-integrating system according to the present invention, the operation being practiced as a tenth preferred embodiment thereof.

In the figure, reference numeral 120 denotes a temporary storage device. The temporary storage device 120 is capable of receiving output from the terminal device 100 for recording and outputting the recorded information back to the terminal device 100. The temporary storage device 100 is a VTR (Video Tape Recorder), a digital VTR, or a DVD-RAM by way of example.

The broadcast receiving block 106 is composed of a tuner 131, an input switch 132, and a separator 133. The tuner 131 extracts, from a broadcast wave of a particular frequency, video, voice, and information superimposed with data 300. The output from the tuner 131 is inputted in the input switch 132 and outputted to the temporary storage device 120 connected to the terminal device 100. The input switch selects one of the output from the tuner 131 and the output from the temporary storage device 120 and outputs the selected output to the separator 133. The separator 133 separates the output coming from the input switch 132 into the television video and voice signals and the data 300.

The above-mentioned constitution allow reproduction of the recorded broadcast data after broadcasting, thereby realizing the same services as those provided in broadcasting.

It will be apparent that, for the temporary storage device 120, the memory block 107 of the terminal device 100 or the read/write enabled package 901 controlled by the package control block 104 may be used.

As described, the preferred embodiments of the present invention provides services that make the most of characteristics of the three types of media. If the data 300 does not have the filter information 310, namely, the media-integrating data 200 alone can provide information that makes the most of the three types of media.

Further, in the preferred embodiments of the present invention, the access control data is updated when the access key or the PPV free key is given in the package data acquiring block 600, the network data acquiring block 610, the broadcast link processing block 640, and the display processing block 550. Namely, by performing the processing in the filtering block 500 by use of the access control data 350, particular information can be acquired only when the particular information is accessed. Also, a PPV program can be made free of charge only when particular information is viewed, by updating the billing control table 380 by use of the access control data 350 in the program receiving block 660.

In the above-mentioned preferred embodiments of the present invention, the data description method has been described by use of HTML for example. It will be apparent that the description language applicable to the present invention is not limited to HTML. Therefore, any data that has the same information as that described in the above-mentioned embodiments is applicable to the present invention no matter what data structure such data has.

In the above-mentioned preferred embodiments of the present invention, the methods of receiving and sending information by use of the three types of media, broadcasting, communication network, and storage medium by way of example have been described. However, such description is for illustrative purposes only. It will be apparent that the applicable media are not restricted to the above-mentioned three types of media and therefore other media having the similar characteristics as those of the three types of media may be used instead of the three types of media or in combination therewith. Namely, any type of medium may be used as long as the services described with reference to the preferred embodiments of the present invention can be achieved.

As described and according to one preferred embodiment of the present invention, integrating the three types of media allows realization of services that make the most of positive information provision by broadcasting, mass storage provided by package, and up-to-date information provided by network. For example, broadcasting allows the user to view the information hitherto not available to the user unless he or she positively goes for it. From the broadcast information, the user can easily retrieve associated detailed information from a package or the associated up-to-date information from a network.

According to another preferred embodiment of the present invention, access control is given to the user when the user accessed particular data in a package or on a network and the data acquired by use of the given access control is selected, thereby providing special exclusive information only to the user who viewed particular information.

Information is selected by the identifier of a package, thereby allowing only those who have a particular package to access special exclusive information.

A television program of PPV can be made free of charge under particular conditions.

Embedding cipher information or user information for server access in link information allows access control in which particular information cannot be accessed unless a predetermined procedure is followed.

Embedding information about a decipher key in link information and arranging ciphertext data and plaintext data in the data to provided for the user allows use of the ciphertext data when access was made from a link containing decipher key information or use of the plaintext data when access was made otherwise, thereby providing special exclusive information to the user under particular conditions.

According to still another preferred embodiment of the present invention, a temporary recording capability of simultaneously recording television video and voice signals and data is added to the terminal device, thereby realizing the same service as those provided in broadcasting by reproducing the recorded information later.

While we have shown and described several preferred embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A terminal device of a media-integrating system comprising:
   a display block for displaying information;
   an input control block for accepting an input instruction from outside;
   a memory block for storing a program;
   a broadcast receiving block for receiving broadcast information and to extract a video signal, an audio signal and data, said broadcast information containing first and second link information;
   a package control block for reading data from a package and writing data thereto;
   a communication control block for performing communication with a communications network;
   a central processing unit for executing said program and performing control on each of the blocks; and
   an information reading block that, based on said first link information of said broadcast information giving an instruction for reading particular information from said package and said second link information giving an instruction for reading information stored in said device, communications network controls said package control block to read said particular information and controls said communication control block to read information from said communications network; and that, based on third link information read out from said particular information giving an instruction for reading another information in said information providing device, communications network controls said to read said another information;
   wherein said broadcast information, said particular information from said package, and said information from said communications network are displayed simultaneously by said display block.

2. A terminal device of a media-integrating system comprising:
   a display block for displaying information;
   an input control block for accepting an input instruction from outside;

a memory block for storing a program;

a broadcast receiving block for receiving broadcast information and to extract a video signal, an audio signal and data, said broadcast information containing first and second link information;

a package control block for reading data from a package and writing data thereto;

a communication control block for performing communication with a communications network;

a central processing unit for executing said program and performing control on each of the blocks; and an information reading block that, based on said first link information of said broadcast information giving an instruction for reading particular information from said package and said second link information giving an instruction for reading information stored in said communications network, controls said package control block to read said particular information and controls said communication control block to read information from said communications network, and that, based on third link information read out from said stored information giving an instruction for reading another information in said package, controls said package control block to read said another information;

wherein said broadcast information, said particular information from said package, and said information from said communications network are displayed simultaneously by said display block.

* * * * *